United States Patent [19]
Davis et al.

[11] Patent Number: 5,838,935
[45] Date of Patent: Nov. 17, 1998

[54] METHOD AND APPARATUS PROVIDING PROGRAMMABLE DECODE MODES FOR SECONDARY PCI BUS INTERFACES

[75] Inventors: Barry R. Davis, Scottsdale; Scott Goble, Chandler, both of Ariz.

[73] Assignee: Intel Corporation, Santa Clara, Calif.

[21] Appl. No.: 580,838

[22] Filed: Dec. 29, 1995

Related U.S. Application Data

[63] Continuation-in-part of Ser. No. 490,775, Jun. 15, 1995, Pat. No. 5,734,847.

[51] Int. Cl.[6] ................................................. G06F 13/00
[52] U.S. Cl. ......................... 395/309; 395/308; 395/287; 395/847; 395/856; 395/882
[58] Field of Search ........................... 395/280–311, 780, 395/842–848, 856, 882

[56] References Cited

U.S. PATENT DOCUMENTS

| | | | |
|---|---|---|---|
| 5,535,343 | 7/1996 | Verseput | 395/308 |
| 5,548,730 | 8/1996 | Young et al. | 395/280 |
| 5,555,383 | 9/1996 | Elazar et al. | 395/306 |
| 5,568,619 | 10/1996 | Blackledge et al. | 395/281 |
| 5,594,882 | 1/1997 | Bell | 711/212 |
| 5,608,876 | 3/1997 | Cohen et al. | 395/281 |
| 5,613,075 | 3/1997 | Wade et al. | 395/287 |
| 5,619,728 | 4/1997 | Jones et al. | 395/847 |
| 5,630,145 | 5/1997 | Chen | 395/750 |
| 5,632,021 | 5/1997 | Jennings et al. | 395/309 |
| 5,634,138 | 5/1997 | Ananthan et al. | 395/841 |
| 5,696,949 | 12/1997 | Young | 395/551 |
| 5,708,849 | 1/1998 | Coke et al. | 395/842 |
| 5,714,476 | 2/1998 | Kundu et al. | 395/855 |
| 5,717,873 | 2/1998 | Rabe et al. | 395/290 |
| 5,721,986 | 1/1998 | Vo | 395/309 |

*Primary Examiner*—Christopher B. Shin
*Attorney, Agent, or Firm*—Blakely, Sokoloff, Taylor & Zafman

[57] ABSTRACT

A PCI-to-PCI bridge is described having a processor configured for performing various routing operations based upon the addresses of transactions carried on interconnected PCI buses. The various routing modes operate on decoded PCI addresses and are described herein as "programmable decode modes." In one programmable decode mode, private address spaces facilitate communication between peer PCI devices without burdening the primary PCI bus or any upstream components such as a host-to-PCI bridge, a host bus and host microprocessors. In another programmable decode mode, subtractive routing operations are provided wherein a secondary PCI interface captures any transactions not claimed on the secondary PCI bus after a predetermined number of clock cycles. The transactions are routed to the primary PCI bus. Another programmable decode mode is "intelligent" bridging wherein conventional inverse positive decode operations are disabled for the entire primary address space of the secondary PCI bus. Only addresses within programmable reverse positive decode address spaces are captured by the secondary PCI interface and forwarded to the corresponding primary PCI bus. Intelligent bridging allows, among other functions, the interconnection of two peer primary PCI buses by a single PCI-to-PCI bridge. Such enables transactions between PCI devices of the peer PCI buses to be routed over the PCI-to-PCI bridge without requiring routing through a host bus.

4 Claims, 17 Drawing Sheets

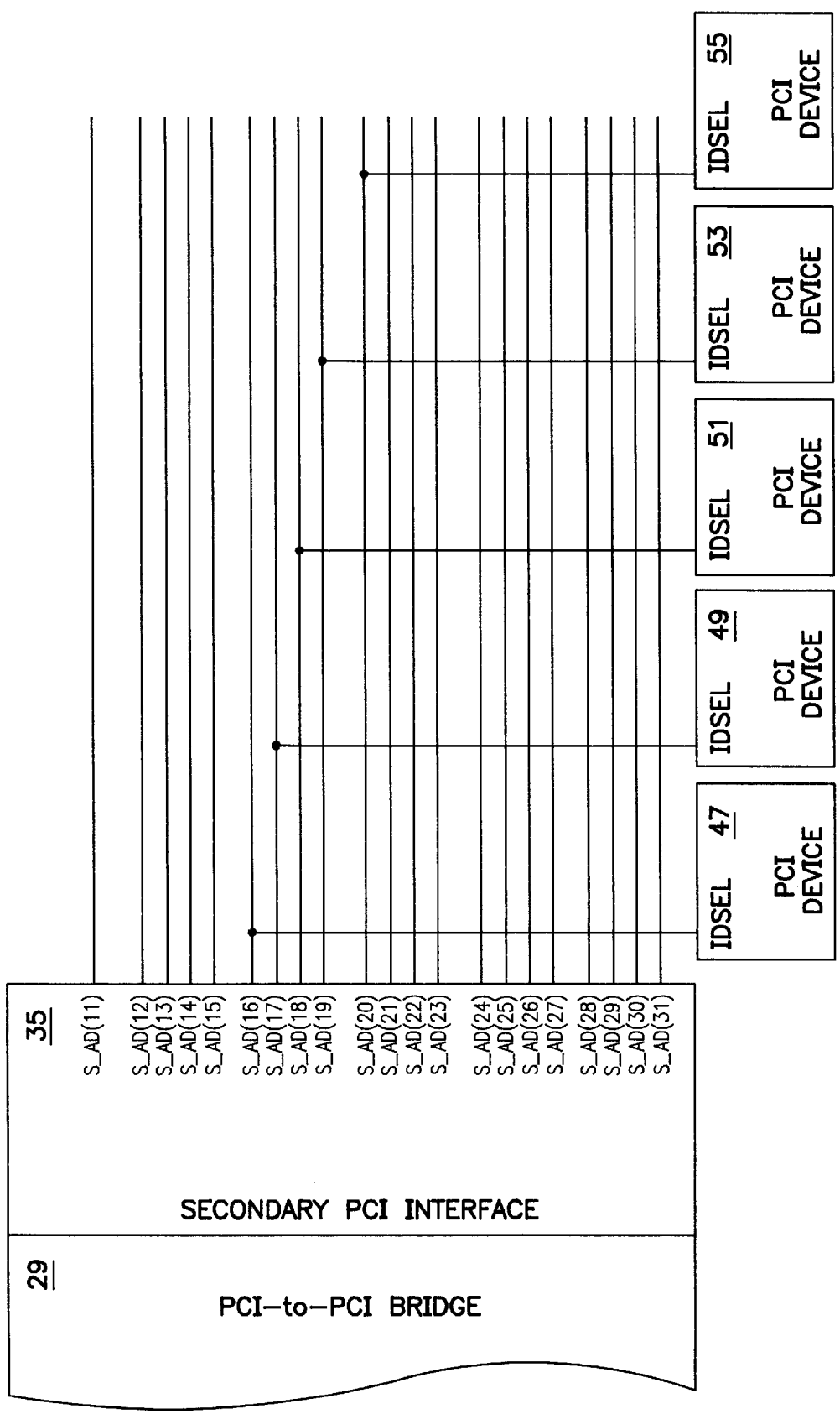

ns within the private address space are not visible to the host processors and do not burden the host processors or the host bus. Details of the implementation of private address spaces was set forth in the parent application and is provided herein as well.

METHOD AND APPARATUS PROVIDING PROGRAMMABLE DECODE MODES FOR SECONDARY PCI BUS INTERFACES

RELATED APPLICATIONS

This application is a continuation-in-part of the U.S. patent application Ser. No. 08/490,775, filed Jun. 15, 1995, entitled "Method and Apparatus for Enabling Intelligent I/O Subsystems Using PCI I/O Devices," of Elliott Garbus and Barry Davis, now patented U.S. Pat. No. 5,734,847.

BACKGROUND OF THE INVENTION

1. Field of the Invention

The invention generally relates to computer bus systems and in particular to computer bus systems incorporating buses configured in accordance with the Peripheral Component Interconnect (PCI) local bus specification.

2. Background

Computer systems employ a wide variety of peripheral components or input/output (I/O) devices. For example, a typical computer system usually contains a monitor, a keyboard, a mouse, a floppy drive, a network controller, a disk drive or an array of disk drives, and, optionally, a printer. High performance computer systems such as servers have more complex I/O device requirements.

Typically, a host processor of the computer system loads a software driver for each of the devices that the computer system is to support. The drivers are loaded into the memory of the system host processor and address space must be allocated to these devices. In addition, in operation, the devices generate interrupts that contend for the processing time of the host processor. System performance suffers dramatically with an increase in the number of I/O devices that the host processor has to support. In addition, there is a loss of bandwidth on the bus due to I/O device interaction from loss bus utilization time due to movement of data and control signals in operation.

An example of a host processor of a computer system connected to I/O devices through a component bus is defined by the PCI Local Bus Specification, Revision 2.0, published by the PCI Special Interest Group. During system initialization, the host processor loads a device driver for each PCI device on the PCI bus. During operation, the PCI bus is occupied each time a read or write transaction is occurring. The part of the host processor's processing time that is used in processing the interrupts generated by each PCI device is taken away from the total processing time of the host processor.

In high performance computer systems such as file and application servers, the time that a host processor spends processing I/O interrupts from PCI devices is considerable and drastically limits the time which the host processor can spend on other computing tasks. This problem is exacerbated as more devices are added to the PCI bus, such as through the use of a PCI-to-PCI bridge following PCI-to-PCI Bridge Architecture Specification, Revision 1.0, for example. As the number of PCI devices connected to the PCI bus increases by the use of the PCI-to-PCI bridge, the host processor spends more and more time dealing with I/O transactions and, therefore, has less time to perform other functions.

The parent of the present application describes one technique for reducing the burden on host processors and host processor system buses for processing signals, such as interrupt signals, generated by devices connected to a secondary PCI bus interface. More specifically, the parent application describes an arrangement wherein a secondary PCI bus is connected through a PCI-to-PCI bridge to a primary PCI bus. The primary PCI bus is connected through a host-to-PCI bridge to a host bus which interconnects one or more host microprocessors. Several devices may be connected to the secondary PCI bus. The PCI-to-PCI bridge is configured to define a private address space within the PCI address space to allow devices connected to the secondary PCI bus to communicate with each other without involving the primary PCI bus, the host-to-PCI bridge, the host bus and the host microprocessors.

Briefly, private address spaces are implemented by configuring a secondary PCI interface to recognize a private address space within the PCI address space. Ordinarily, a secondary PCI interface of the PCI-to-PCI bridge captures all transactions having addresses outside of a secondary address space portion of the PCI address space and forwards those transactions to the primary PCI bus. This is referred to herein as "inverse positive address decoding." To implement the private address space, inverse positive decoding is disabled for a portion of the primary PCI address space ordinarily subject to inverse positive decoding. The address range for which inverse positive decoding is disabled is the private address space. Any transactions within the private address space are therefore not captured by the secondary PCI interface and are not routed to the primary PCI bus. Rather, transactions within the private address space are allowed to be captured by other "peer" PCI devices connected to the secondary PCI bus. In this manner, bus transactions within the private address space are not visible to the host processors and do not burden the host processors or the host bus. Details of the implementation of private address spaces was set forth in the parent application and is provided herein as well.

Thus, the implementation of private address spaces within a secondary PCI bus allows devices connected to the secondary PCI bus to communicate with one another without burdening the primary PCI bus, the host bus or the host microprocessor. Private address spaces are primarily intended for use within "hierarchical" PCI bus configurations of the type described above wherein the secondary PCI bus is interconnected through a primary PCI bus to the host bus. Room for improvement, however, remains.

With private address spaces, it is possible, for one reason or another, that transactions defined within the private address space may not be claimed by any of the PCI devices connected to the secondary PCI bus. Since the transactions are within the private address space, the transactions are therefore also not captured by the secondary PCI interface. Accordingly, an error condition can occur. It would be desirable to provide an improved method for implementing a private address space wherein such error conditions are avoided.

Also, although private address spaces facilitate communication between a pair of peer PCI devices connected to the same secondary PCI bus, private address spaces are not necessarily helpful in facilitating communication between PCI devices connected to separate peer PCI buses. In other words, within an arrangement wherein two separate primary PCI buses are connected through respective host-to-PCI bridges to a single host bus, devices connected to the separate primary PCI buses cannot ordinarily communicate with one another without routing the transactions over the host bus thereby consuming host bus bandwidth and burdening the host processors. It would be desirable to provide an improved PCI bus system wherein transactions between PCI devices connected to peer PCI buses can be accommodated without requiring routing of transactions onto the host bus. It is to these ends that aspects of the present invention are drawn.

SUMMARY OF THE INVENTION

In accordance with one aspect of the invention, error conditions are avoided on a secondary PCI bus employing a private address space by implementing "subtractive transaction routing" within the secondary PCI interface. With subtractive transaction routing, any transactions on the secondary PCI bus that are not claimed within a predetermined number of clock cycles are automatically captured by the secondary PCI interface and routed to the primary PCI bus. Hence, any transactions within the private address space which are not properly captured by one of the devices connected to the secondary PCI bus are ultimately captured by the secondary PCI interface, thereby avoiding error conditions. The subtractive operation is, however, not limited to transactions within the private address space but applies to any transactions within the PCI address space not captured within the predetermined number of clock cycles.

In accordance with another aspect of the invention, an improved PCI bus system is provided which facilitates transmission of transactions between PCI devices connected to peer PCI buses. The improved PCI bus system includes a pair of peer primary PCI buses interconnected through respective host-to-PCI bridges to a host bus which interconnects one or more host microprocessors. A single PCI-to-PCI bridge interconnects the pair of peer primary PCI buses. With this arrangement, transactions generated by a PCI device connected to one of the primary PCI buses may be routed through the PCI-to-PCI bridge to a device connected to the other PCI bus. In other words, the host bus and the host-to-PCI bridges are bypassed.

Other more elaborate PCI bus interconnection systems are also feasible. In one system, three peer primary buses are respectively connected through separate host-to-PCI bridges to a single host bus. A pair of PCI-to-PCI bridges interconnect the three peer PCI buses. More specifically, a first PCI-to-PCI bridge interconnects first and second primary PCI buses and a second PCI-to-PCI bridge interconnects second and third PCI buses. In another arrangement, PCI-to-PCI bridges are employed to interconnect a pair of hierarchical PCI buses both having primary and secondary PCI buses. First and second hierarchical PCI buses are provided each having a secondary PCI bus interconnected through a PCI-to-PCI bridge to a primary PCI bus. The primary PCI buses are interconnected, respectively, through host-to-PCI bridges to a single host bridge. A first additional PCI-to-PCI bridge interconnects the two primary PCI buses. A second additional PCI-to-PCI bridge interconnects the two secondary PCI buses.

The interconnection of peer PCI buses using a PCI-to-PCI bridge is facilitated by employing a technique described herein as "intelligent" bridging. With intelligent bridging, a processor within the PCI-to-PCI bridge examines the addresses of transactions on a secondary PCI bus and forward only selected transactions to the primary PCI bus. In other words, conventional inverse positive decoding, wherein all transactions not within the secondary address space automatically routed to the primary PCI bus, is fully disabled. Only transactions within selected address spaces are captured by the secondary PCI interface and forwarded to the primary PCI bus. Intelligent bridging differs from bridging using private address spaces as follows. With private address spaces, inverse positive decoding is disabled only for transactions within the private address space. With intelligent bridging, inverse positive decoding is completely disabled and only transactions within a selected address spaces are routed to the primary PCI bus.

Intelligent bridging facilitates the use of PCI-to-PCI bridges to interconnect peer PCI buses as follows. One of the peer buses is designated as a primary PCI bus from the standpoint of the PCI-to-PCI bridge. The other is designated as a secondary PCI bus. Inverse positive decoding on the secondary PCI bus is disabled and only transactions within selected "reverse positive decode" address spaces are routed to the primary PCI bus. In accordance with conventional techniques, a portion of the address space of the primary PCI bus is designated as a secondary PCI address space and transactions on the primary PCI bus within that address space are captured by a primary bus interface of the bridge and routed to the secondary PCI bus. In this manner, selective routing of transactions from the PCI bus designated as primary to the PCI bus designated as secondary is achieved using a combination of conventional positive decoding the intelligent bridging function.

Thus, in accordance with the invention, subtractive bridging operations and intelligent bridging operations are provided within a PCI-to-PCI bridge. The subtractive and intelligent bridging operations may be performed in conjunction with private address space bridging operations. Although intelligent bridging operations are preferably employed within PCI-to-PCI bridges interconnecting peer PCI buses, intelligent bridging may also be employed within conventional hierarchical bus arrangements wherein a PCI-to-PCI bridge interconnects primary and secondary PCI buses.

BRIEF DESCRIPTION OF THE DRAWINGS

FIG. 3a–c illustrate three different embodiments of the I/O subsystem configured in accordance with the current invention.

DETAILED DESCRIPTION OF EXEMPLARY EMBODIMENTS OF THE INVENTION

Figure 1:
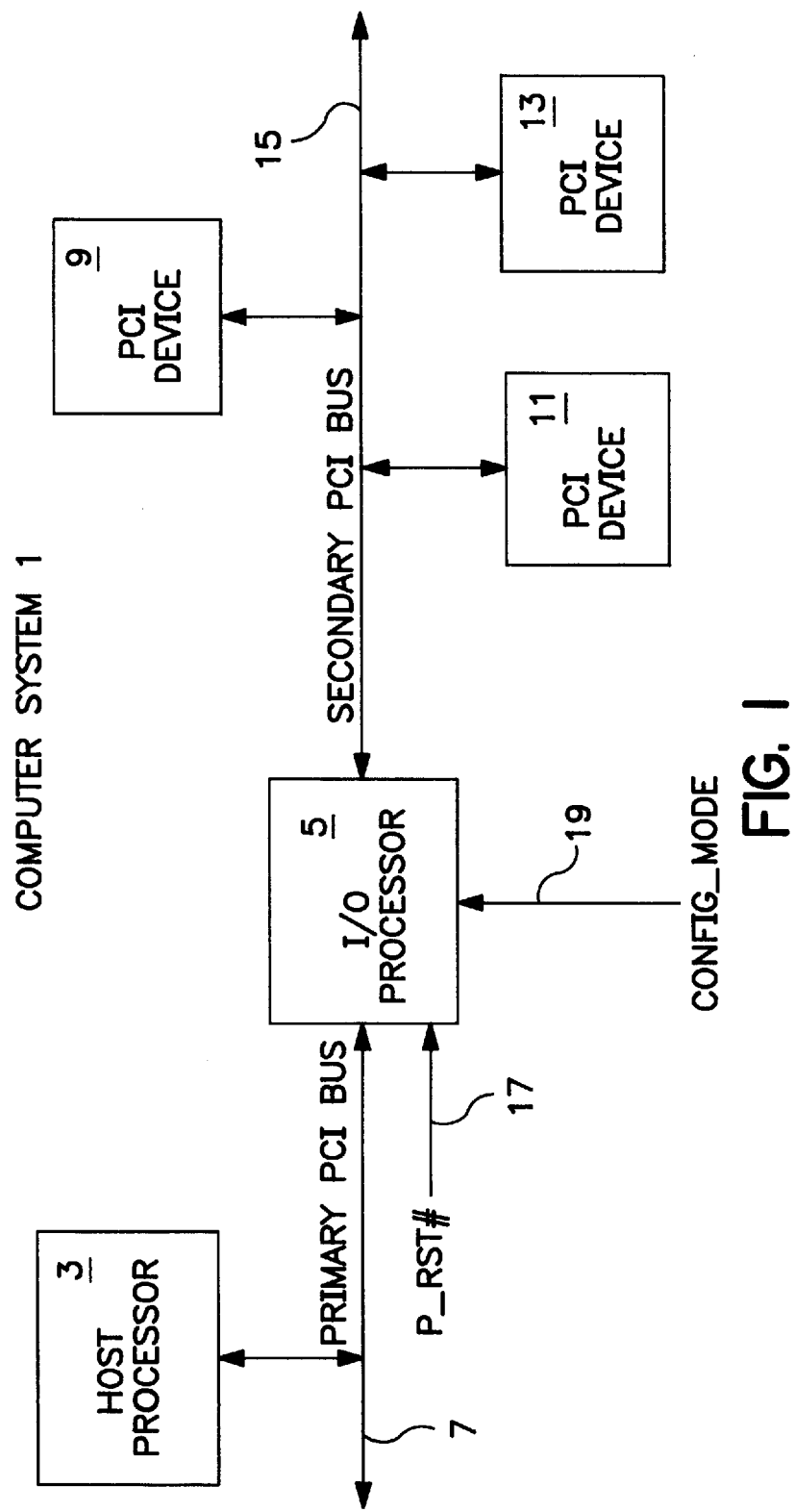
FIG. 1 is a block diagram of a computer system containing an I/O processor for creating an I/O subsystem configured in accordance with one embodiment of the current invention.

With reference to the remaining figures, exemplary embodiments of the invention will now be described. The exemplary embodiments are described primarily with reference to block diagrams and flowcharts. As to the flowcharts, each block within the flowcharts represents both the method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

A PCI-to-PCI bridge having the capability to define private address spaces is described with reference to FIGS. 1–7. FIGS. 9–14 describe subtractive bridging operations and intelligent bridging operations for use within the PCI-to-PCI bridge and further illustrate alternative arrangements for interconnecting PCI buses using PCI-to-PCI bridges.

Private Address Spaces
I. Terminology and Conventions
A. Representation of Numbers All numbers in this document can be assumed to be base 10 unless designated otherwise. In text and tables, numbers in base 16 are represented as "nnnH" and numbers in base 2 are represented as "nnn2", where the "H" signifies hexadecimal and "2" signifies binary. In pseudo code descriptions, hexadecimal numbers are represented in the form 0x1234ABCD. Binary numbers are also assumed when bit operations or bit ranges are used.

B. Fields

A preserved field in a data structure is one that the processor does not use. Preserved fields can be used by software; the processor will not modify such fields.

A reserved field is a field that may be used by an implementation. If the initial value of a reserved field is supplied by software, this value must be zero. Software should not modify reserved fields or depend on any values in reserved fields.

A read only field can be read to return the current value. Writes to read only fields are treated as no-op operations and will not change the current value nor result in an error condition.

A read/clear field can also be read to return the current value. A write to a read/clear field with the data value of 0 will cause no change to the field. A write to a read/clear field with a data value of 1 will cause the field to be cleared (reset to the value of 0). For example, if a read/clear field has a value of F0H, and a data value of 55H is written, the resultant field will be A0H.

C. Specifying Bit and Signal Values

The terms "set" and "clear" in this specification refer to bit values in register and data structures. If a bit is set, its value is "1"; if the bit is clear, its value is "0". Likewise, "setting" a bit means giving it a value of "1" and "clearing" a bit means giving it a value of "0 ".

The terms "assert" and "de-assert" refer to the logically active or inactive value of a signal or bit, respectively.

D. Signal Name Conventions

All signal names use the signal name convention of using the "#" symbol at the end of a signal name to indicate that the signal's active state occurs when it is at a low voltage. This includes processor related signal names that normally use an overline. The absence of the "#" symbol indicates that the signal's active state occurs when it is at a high voltage.

E. Terminology

To aid the discussion of the I/O processor architecture, the following terminology is used:

| | |
|---|---|
| Downstream | At or toward a PCI bus with a higher number (after configuration). |
| Upstream | At or toward a PCI bus wth a lower number (after configuration). |
| DWORD | 32-bit data word. |
| Host processor | Processor located upstream from the I/O processor. |
| Local processor | The processor within the I/O processor. |
| Local bus | Local processor bus. |
| Local memory | Memory subsystem on the local processor's local bus. |
| Inbound | At or toward a local processor's local bus. |
| Outbound | At or toward a PCI bus. |

F. Pin functions and names

All pin functions and names conform to the PCI Local Bus Specification, Revision 2.0, published by the PCI Special Interest Group, except as noted below. In the discussion that follows, the preferred embodiment involves the use of a primary PCI bus and a secondary PCI bus. Consequently, the terms "P__" and "S__" will to prepended to the names of a pin or a set of pins corresponding to the primary PCI bus and the secondary PCI bus, respectively. For example, P__AD[31:00] represents the address and data lines on the primary PCI bus while S__AD[31:00] represents the address and data lines on the secondary PCI bus, respectively.

II. System Overview

FIG. 1 illustrates a computer system 1 containing one embodiment of the present invention. A host processor 3 is connected to and communicates with an input/output (I/O) processor 5 through a primary PCI bus 7. I/O processor 5 is connected to and communicates with a PCI device 9, a PCI device 11, and a PCI device 13 through the use of a secondary PCI bus 15.

Host processor 3 contains elements that are typically found in most general purpose computers and almost all special purpose computers. In fact, the several elements contained within host processor 3 are intended to be representative of this broad category of data processors. In one example, host processor 3 can contain a microprocessor and a main memory. In another example, host processor 3 can contain more than one microprocessor, a main memory and a cache memory.

PCI devices 9, 11 and 13 are intended to represent any PCI device that conforms with the PCI Local Bus Specification, Revision 2.0. For example, PCI device 9 can be a Small Computer Systems Interface (SCSI) drive controller, PCI device 11 can be an Ethernet network controller, and PCI device 13 can be a VGA card.

Figure 2:
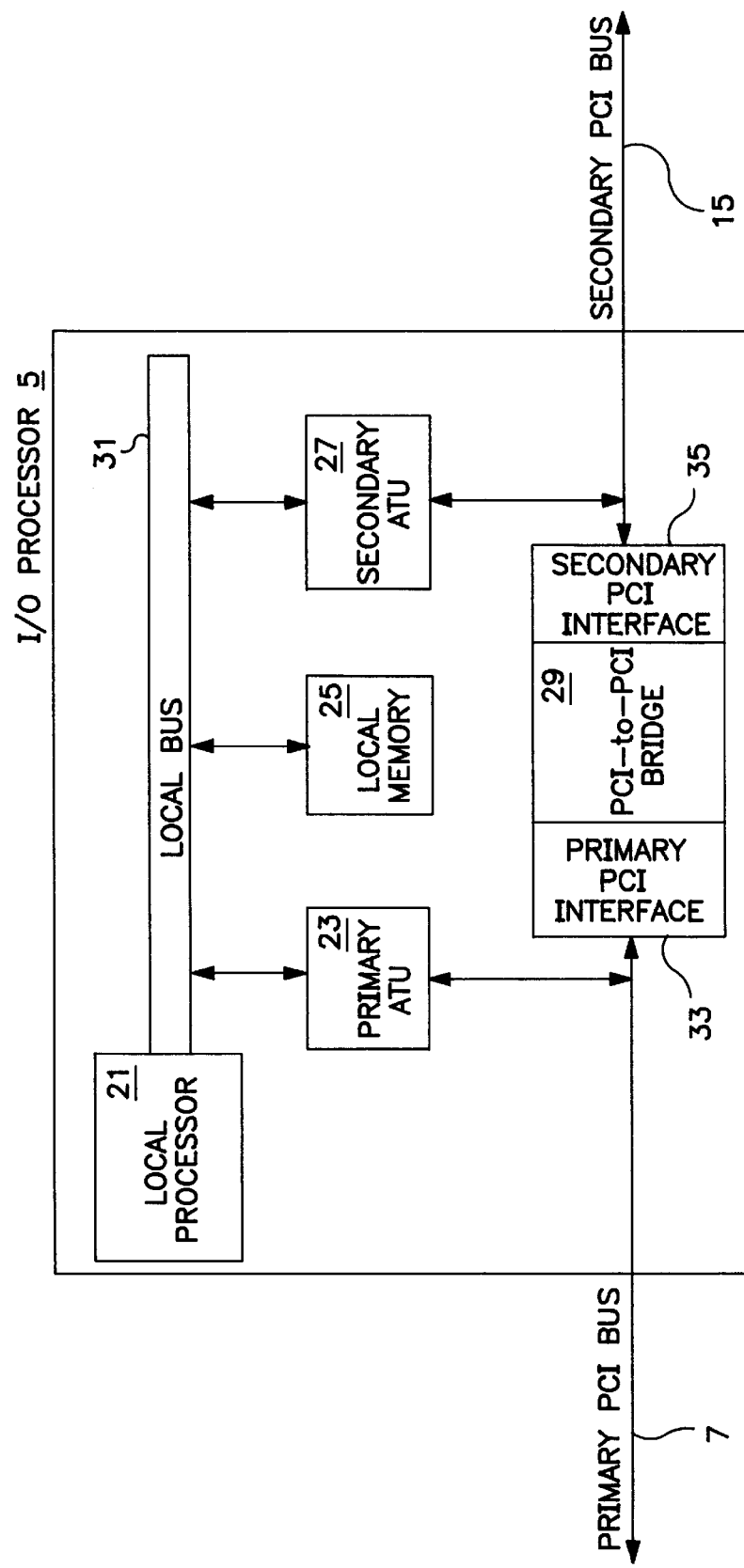
FIG. 2 is a block diagram of one embodiment of the I/O processor configured in accordance with the current invention.

FIG. 2 is a block diagram of an embodiment of I/O processor 5 of the present invention. I/O processor 5 comprises a local processor 21, a primary address translation unit (ATU) 23, a local memory 25, a secondary ATU 27, and a PCI-to-PCI bridge (bridge) 29. Local processor 21, primary ATU 23, local memory 25 and secondary ATU 27 are connected to and communicate through the use of a local system bus (local bus) 31. Bridge 29 further includes a primary PCI interface 33 and a secondary PCI interface 35 that connects bridge 29 to primary PCI bus 7 and secondary PCI bus 15, respectively. Primary ATU 23 and bridge 29 are connected to and communicate through the use of primary PCI bus 7. Secondary ATU 27 and bridge 29 are connected to and communicate through the use of secondary PCI bus 15. Both primary PCI bus 7 and secondary PCI bus 15 are independent PCI buses that conform to the PCI Local Bus Specification, Revision 2.0, published by the PCI Special Interest Group.

Local processor 21 is intended to represent a general purpose computer processor. In the preferred embodiment, local processor 21 operates out of its own 32-bit address space and not PCI address space. A processor that can be used is the 80960 JF microprocessor from Intel Corporation.

Bridge 29 connects the two independent PCI buses and allows certain bus transactions on one PCI bus to be forwarded to the other PCI bus. Bridge 29 also allows fully independent PCI bus operation, including independent clocks. Bridge 29 in I/O processor 5 is fully compliant with the PCI-to-PCI Bridge Architecture Specification, Revision 1.0 published by the PCI Special Interest Group. Bridge 29 has a set of configuration registers that is accessible through primary PCI bus 7.

Local memory 25 is intended to represent a broad category of memory such as DRAM, SRAM and Flash Memory. Local memory 25 also contains logic circuitry required to access any memory circuitry contained in local memory 25. Local memory 25 stores executable code and other data used in the operation of local processor 21. Access is accomplished through regular memory-format instructions from local processor 21. In addition, as described below, local memory 25 contains all configuration registers of primary ATU 23, secondary ATU 27 and bridge 29 as memory-mapped registers. Each of these registers is accessed as a memory-mapped 32-bit register with a unique memory address. Alternatively, instead of using memory-mapped registers, the configuration registers of bridge 29 can be contained inside bridge 29 as hardware registers. Similarly, the memory-mapped configuration registers of primary ATU 23 and secondary ATU 27 can also be hardware registers contained in primary ATU 23 and secondary ATU 27, respectively. Further, if the configuration registers were contained in each respective device, then primary ATU 23 would not be necessary in the configuration of bridge 29 and secondary ATU 27.

III. Private PCI Devices

Still referring to FIG. 2, Type 1 commands received by primary PCI interface 33 of bridge 29 are converted to Type 0 commands by bridge 29 to configure PCI devices connected to secondary PCI interface 35. The operation and use of the 32-bit Type 1 and Type 0 PCI configuration commands are as defined in the PCI Local Bus Specification, Revision 2.0 and will not be discussed in detail.

Private PCI Devices Using S AD[15:11]

In default operation of the present invention, a unique encoding in primary addresses P_AD[15:11] in a Type 1 command received on primary PCI interface 33 of bridge 29 results in the assertion of one bit in secondary addresses S_AD[31:16] in a Type 0 command on secondary PCI bus 15 during the Type 1 to Type 0 conversion by bridge 29 as shown in Table 1, below.

TABLE 1

IDSEL Mapping for Type 1 to Type 0 Conversions

| Primary Address P_AD[15:11] | Secondary Address Bits S_AD[31:11] |
|---|---|
| 15    11 | 31   27   23   19   15   11 |
| 0000 02 | 0000 0000 0000 0001 0000 02 |
| 0000 12 | 0000 0000 0000 0010 0000 02 |
| 0001 02 | 0000 0000 0000 0100 0000 02 |
| 0001 12 | 0000 0000 0000 1000 0000 02 |
| 0010 02 | 0000 0000 0001 0000 0000 02 |
| 0010 12 | 0000 0000 0010 0000 0000 02 |
| 0011 02 | 0000 0000 0100 0000 0000 02 |
| 0011 12 | 0000 0000 1000 0000 0000 02 |
| 0100 02 | 0000 0001 0000 0000 0000 02 |
| 0100 12 | 0000 0010 0000 0000 0000 02 |
| 0101 02 | 0000 0100 0000 0000 0000 02 |
| 0101 12 | 0000 1000 0000 0000 0000 02 |
| 0110 02 | 0001 0000 0000 0000 0000 02 |
| 0110 12 | 0010 0000 0000 0000 0000 02 |
| 0111 02 | 0100 0000 0000 0000 0000 02 |
| 0111 12 | 1000 0000 0000 0000 0000 02 |
| 1XXX X2 | 0000 0000 0000 0000 0000 02 |

X = Don't Care

Figure 3A:
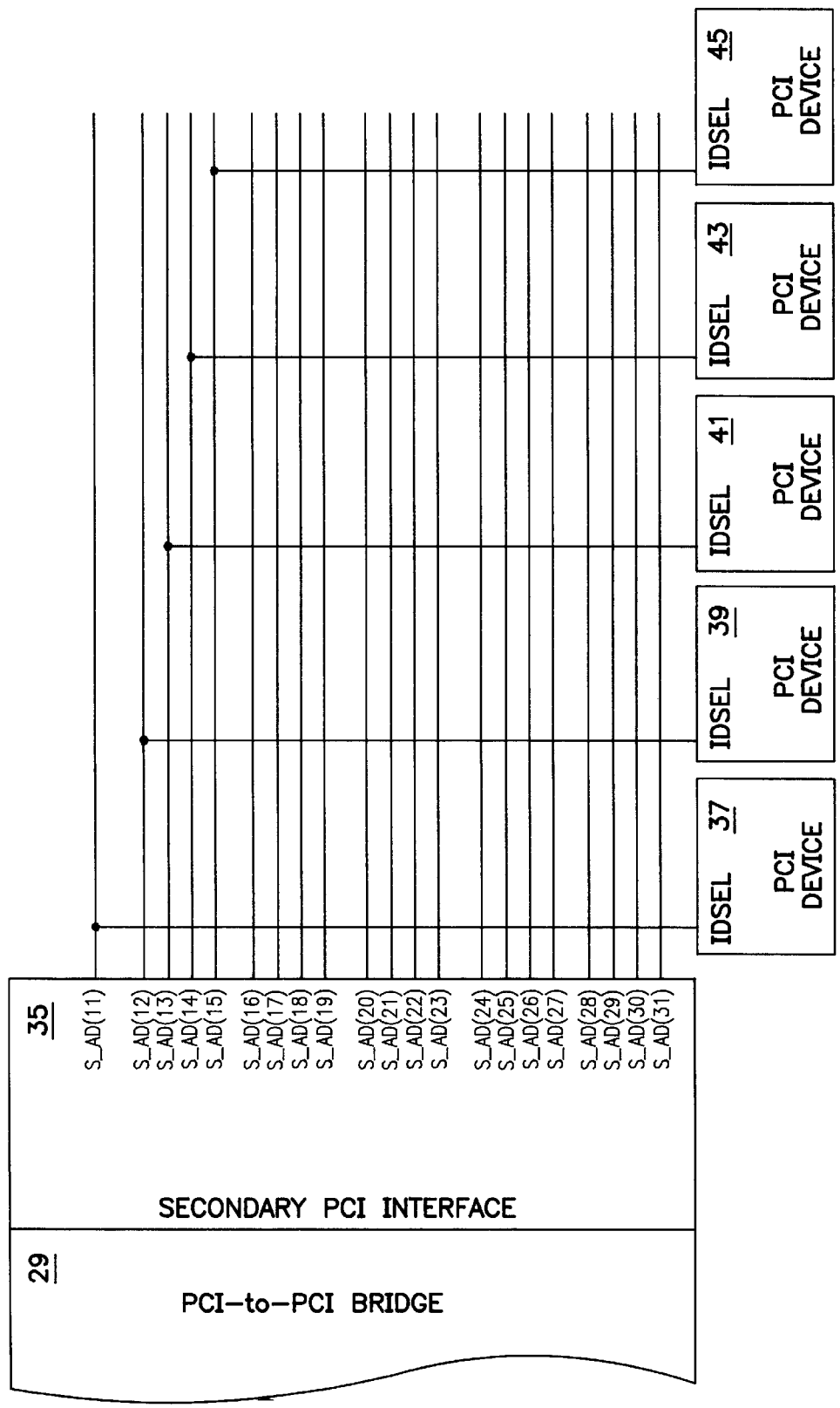

It will be appreciated that no encoding of P_AD[15:11] on primary PCI interface 33 will assert bits S_AD[15:11] on secondary PCI interface 35. In other words, no intelligent agent which is attached to primary PCI interface 33 of bridge 29 can configure a PCI device on the secondary PCI bus 15 if the PCI device has its IDSEL line attached to any one of the bits of S_AD[15:11]. For example, FIG. 3a illustrates five PCI devices 37, 39, 41, 43 and 45 that have their IDSEL lines tied to S_AD[11], S_AD[12], S_AD[13], S_AD[14] and S_AD[15], respectively. Each of PCI devices 37, 39, 41, 43 and 45 are private and only secondary ATU 27 will be able to send Type 0 configuration commands to them. In most operations, Local processor 21 can access the private device only through the use of secondary ATU 27.

Thus, in Type 1 to Type 0 conversions, P_AD[15:11] are decoded to assert a unique address line only from S_AD[31:16] on secondary PCI interface 35 as described above. This leaves S_AD[15:11] on secondary PCI interface 35 open for up to 5 address lines for IDSEL assertion of private PCI devices. These 5 address lines shall be reserved for private PCI devices on secondary PCI bus 15 and any PCI device that has its IDSEL connected to any one of S_AD[15:11] will automatically become a private PCI device.

Private PCI Devices Using SISR 75 and S AD[20:16]

Figure 4:
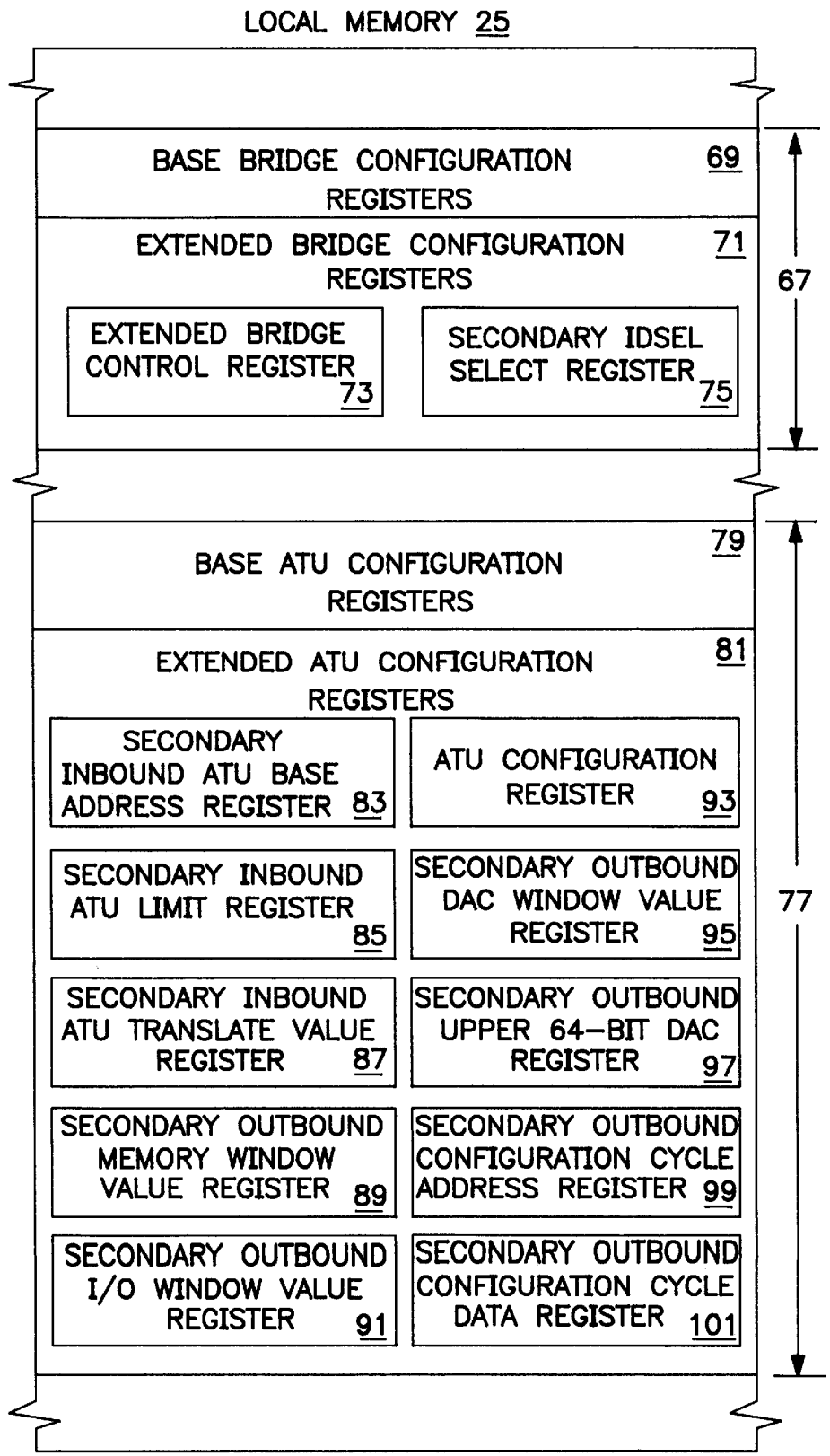
FIG. 4 illustrates a portion of a local memory contained in the I/O processor which contains a memory-mapped register summary of all configuration registers of a PCI-to-PCI bus bridge and two address translation units.

FIG. 4 illustrates a portion of local memory 25 which has a memory-mapped register summary of all configuration registers 67 of bridge 29. A set of base bridge configuration registers 69 includes all the registers defined by the PCI-to-PCI Bridge Architecture Specification, Revision 1.0. In addition, a set of extended bridge configuration registers 71 includes two additional registers: (1) an Extended Bridge Control Register (EBCR) 73 and (2) a Secondary IDSEL Control Register (SISR) 75.

EBCR 73 contains a Configuration Cycle Disable bit that will cause primary PCI interface 33 of bridge 29 to respond to all configuration cycles with a Retry condition until the Configuration Cycle Disable bit is cleared. In other words, configuration commands will only be accepted on primary PCI interface 33 if the Configuration Cycle Disable bit within the EBCR 73 is cleared. If the Configuration Cycle Disable bit is set, primary PCI interface 33 will signal a Retry on all PCI cycles, including Type 1 and Type 0 configuration commands.

Bits [4:0] of SISR 75 control the usage of masking bits in the conversion of Type 1 PCI configuration commands to Type 0 PCI configuration commands from primary PCI interface 33 to secondary PCI interface 35 for the creation of private PCI devices. The functioning of SISR 75 in the creation of private PCI devices is detailed further below.

If more than 5 unique address lines are required, SISR 75 can be configured to block secondary addresses S_AD [20:16] from being asserted after a conversion of a Type 1 command received on primary PCI interface 33 to a Type 0 conversion on secondary PCI interface 35. By setting the appropriate bits in SISR 68, bits 4, 3, 2, 1 or 0 for S_AD[20], S_AD[19], S_AD[18], S_AD[17] or S_AD [16], respectively, the associated address line can be forced to remain deasserted for any P_AD[15:11] encoding of 000002 to 001002 and therefore is free to be used as an IDSEL select line for private PCI devices. Table 2, below, shows the possible configurations of S_AD[31:11] for private Type 0 commands on the secondary interface. For example, if SISR 75 bit 0 is set, S_AD[16] will never be asserted during a Type 1 to Type 0 conversion as bridge 29 will, by using SISR 75 as a mask, force S_AD[16] to zero on the secondary PCI interface 35. Bridge 29 will perform the Type 1 to Type 0 conversion but not assert the reserved S_AD address line. The Type 0 command will then be ignored on secondary PCI bus 15. The device with its IDSEL line attached to S_AD[16] can only be accessed by secondary ATU 27.

TABLE 2

Private PCI Memory IDSEL Select Configurations

| Secondary Addresses S_AD[31:11]<br>31  27  23  19  15  11 | Secondary IDSEL Select Register (SISR)<br>Bits 4–0<br>4   0 | Use |
|---|---|---|
| 0000 0000 0000 0000 0000 12 | XXXX X2 | Already reserved |
| 0000 0000 0000 0000 0001 02 | XXXX X2 | for private PCI |
| 0000 0000 0000 0000 0010 02 | XXXX X2 | Devices |
| 0000 0000 0000 0000 0100 02 | XXXX X2 | |
| 0000 0000 0000 0000 1000 02 | XXXX X2 | |
| 0000 0000 0000 0001 0000 02 | XXXX 12 | Can be used for |
| 0000 0000 0000 0010 0000 02 | XXX1 X2 | private PCI |
| 0000 0000 0000 0100 0000 02 | XX1X X2 | devices only if |
| 0000 0000 0000 1000 0000 02 | X1XX X2 | the associated bit |
| 0000 0000 0001 0000 0000 02 | 1XXX X2 | in SISR is set |

X = Don't Care

Referring to FIG. 3b, where PCI devices 47, 49, 51, 53 and 55 have their IDSEL lines attached to S_AD[16], S_AD[17], S_AD[18], S_AD[19] and S_AD[20], respectively, and following the example above, if only bit 0 of SISR 75 is set and bits [4:1] of SISR 75 are clear, only PCI device 47 would be a private PCI device. S_AD[17], S_AD[18], S_AD[19] and S_AD[20] can be accessed by a Type 1 configuration command asserting P_AD[15:11] equal to 000012, 000102, 000112 and 001002, respectively. Similarly, if it was desired to make PCI device 51 a private PCI device, PCI device 51 being attached to S_AD[18], bit [2] of SISR 75 should be set. If it was desired to make PCI devices 47, 49, 51, 53 and 55 all be private devices, bits [4:0] of SISR 75 would all be set, thereby masking any assertion of the IDSEL lines of PCI devices 47, 49, 51, 53 and 55 on a Type 1 to Type 0 conversion by bridge 29. Therefore, by using SISR 75 and the 5 reserved address lines, a total of 10 IDSEL signals are available for private PCI devices.

Figure 3C:
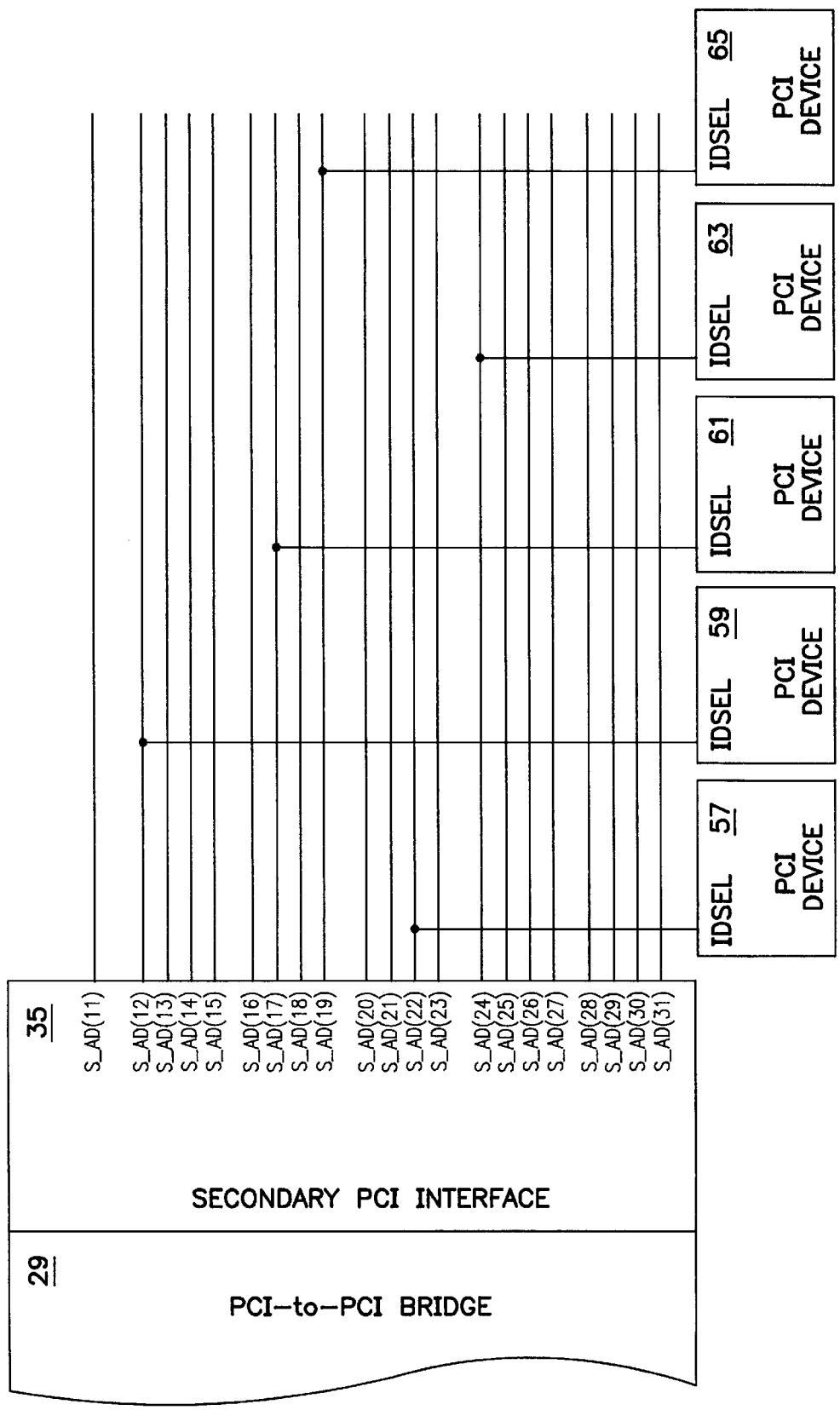

Referring to FIG. 3c, where PCI devices 57, 59, 61, 63 and 65 have their IDSEL lines attached to S_AD[22], S_AD[12], S_AD[17], S_AD[24] and S_AD[19], respectively, there could be a maximum of three private PCI devices and a minimum of one private PCI device. To achieve the maximum of three private PCI devices, bits [1] and [3] of SISR 75 would be set to make PCI devices 59 and 65, respectively, private. PCI device 59 is made private by attaching it to S_AD[12] as discussed above.

In the current invention, a PCI device is made private by either (1) attaching the PCI device's IDSEL line to S_AD [15:11], or (2) by attaching the PCI device's IDSEL line to S_AD[20:16] and programming the appropriate bit in SISR 75. As previously discussed, Type 0 configuration commands that are generated by conversion from Type 1 configuration messages can never assert any bits of S_AD [15:11]. Programming SISR 75 will selectively suppress the assertion of S_AD[20:16] on the conversion of Type 1 to Type 0 configuration commands. Either mechanism ensures that no intelligent agent on primary PCI bus 7, including host processor 3, will be able to detect any device that has been made private.

IV. Private Address Spaces

As discussed above, I/O processor 5 can create PCI devices that can use the secondary PCI bus yet avoid detection by host processor 3. At initialization, these private devices are hidden from host processor 3 because they do not respond to PCI configuration cycles generated by host processor 3. These private devices can be configured by secondary ATU 27 through normal PCI configuration cycles. I/O processor 5 can also support and control these private PCI devices through the use of secondary ATU 27. In addition, these private devices would be accessible by other PCI devices, both private and non-private, on secondary PCI bus 15. The private devices are accessed by the use of a private address space, as explained below.

Creation of Private Address Spaces

Figure 5:
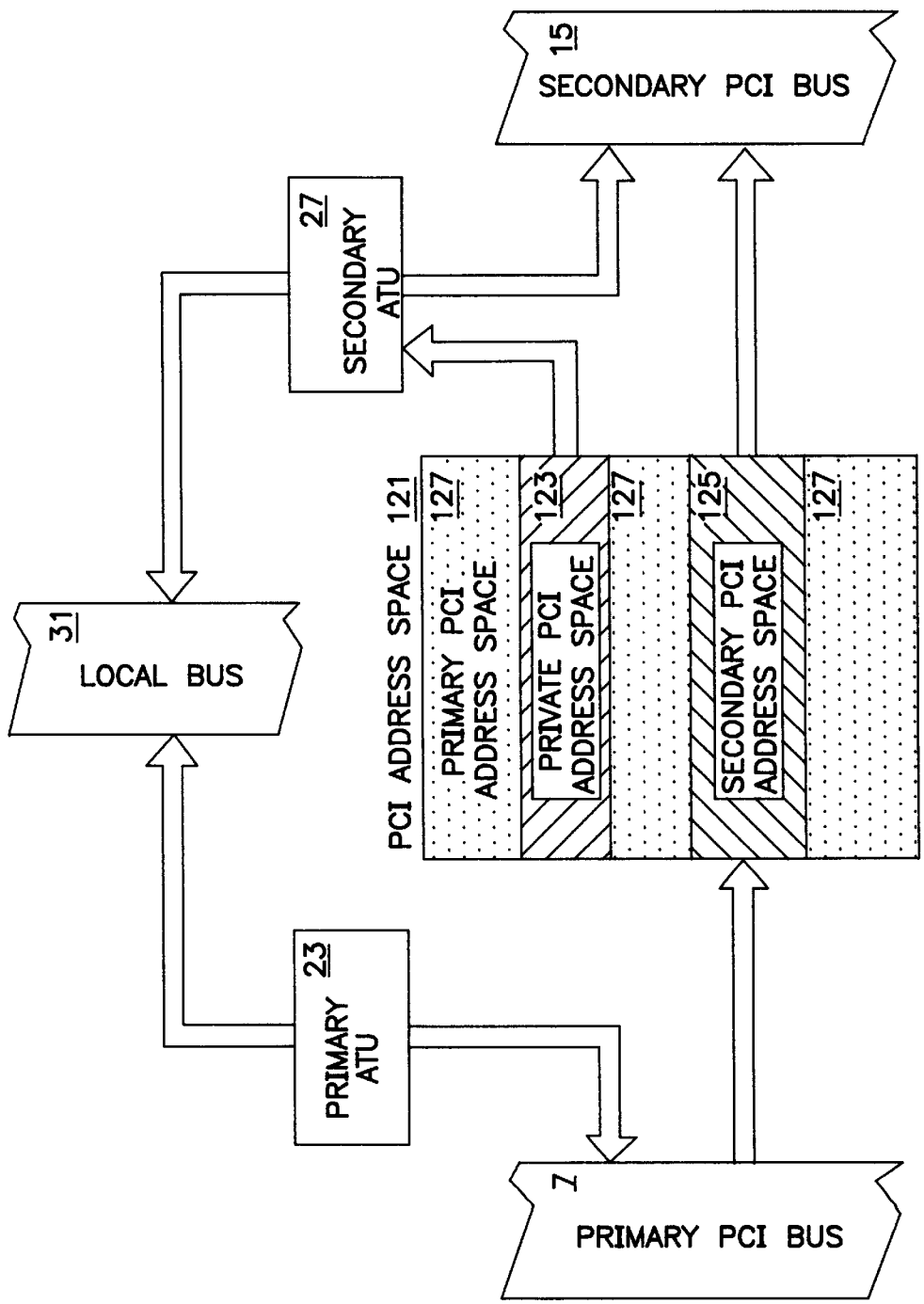
FIG. 5 illustrates a PCI address space configured to have a primary PCI address space, a secondary PCI address space and private PCI address space.

FIG. 5 illustrates a PCI address space 121 configured to have a private PCI address space 123, a secondary PCI address space 125 and a primary PCI address space 127. Normally, addresses generated on the primary PCI bus which are within the secondary PCI address space are transferred downstream to the secondary PCI bus by a PCI-to-PCI bridge. Also, a PCI-to-PCI bridge will forward all addresses that are not mapped to a secondary PCI address space from the secondary PCI bus to the primary PCI bus. In the present invention, secondary PCI interface 35 of bridge 29 implements private PCI address space 123 for private PCI devices on secondary PCI bus 15 where bridge 29 ignores and DOES NOT forward a range of primary addresses received on secondary PCI interface 35 to primary PCI interface 33. Private PCI address space 123 is defined at configuration time by local processor 21.

In operation, on secondary PCI bus 15, private devices utilize private PCI address space 123 that is not available to any intelligent agent on primary PCI bus 7, including host processor 3. This private address space is defined as a set of primary addresses NOT forwarded upstream through bridge 29.

In addition, the addresses contained in private PCI address space 123—which are primary addresses—can still be used by PCI agents on primary PCI bus 7 to addressing devices on primary PCI bus 7 as bridge 29 will not forward primary addresses received on primary PCI interface 33 to secondary PCI bus 15. Therefore, by creating private PCI address space, the present invention also allows more primary addresses to be conserved for use by devices on primary PCI bus 7. Also, devices on secondary PCI bus 15 can use private PCI address space 123 to perform peer-to-peer transactions with no bandwidth implications to primary PCI bus 7. Similarly, devices on primary PCI bus 7 can use the addresses contained in private PCI address space 123 to address other devices on primary PCI bus 7.

Continuing to refer to FIG. 5 and referring again to FIG. 2, Primary ATU 23 and secondary ATU 27 allows PCI transactions direct access to local memory 25. Also, local processor 21 has direct access to the both primary PCI bus 7 and secondary PCI bus 15 through the use of primary ATU 23 and secondary ATU 27, respectively. Address translation is provided for transactions between PCI address space 121 and local processor address space (not shown), both of which are 4 gigabytes in size. As discussed below, address translation is controlled through programmable configuration registers which are accessible from both the PCI interface and local processor 21 and which allow flexibility in mapping the two address spaces.

Referring again to FIG. 4, another portion of local memory 25 has another memory-mapped register summary of all configuration registers 77 of primary ATU 23 and secondary ATU 27. A read or write to one of these registers returns data from the PCI bus and not from the register itself. A set of base ATU configuration registers 79 includes all the registers defined by PCI Local Bus Specification, Revision 2.0. In addition, a set of extended ATU configuration registers 81 includes ten additional registers for creating private PCI address space 123:

(1) Secondary Inbound ATU Base Address Register (SIABAR) 83;

(2) Secondary Inbound ATU Limit Register (SIALR) 85;

(3) Secondary Inbound ATU Translate Value Register (SIATVR) 87;

(4) Secondary Outbound Memory Window Value Register (SOMWVR) 89;

(5) Secondary Outbound I/O Window Value Register (SOIOWVR) 91;

(6) ATU Configuration Register (ATUCR) 93;

(7) Secondary Outbound DAC Window Value Register (SODWVR) 95;

(8) Secondary Outbound Upper 64-bit DAC Register (SOUDR) 97;

(9) Secondary Outbound Configuration Cycle Address Register (SOCCAR) 99; and

(10) Secondary Outbound Configuration Cycle Data Register (SOCCDR) 101.

SIABAR 83, SIALR 85, and SIATVR 87 are used in inbound address translations. SIABAR 83 contains the address of the base of a secondary inbound window on secondary PCI bus 15. SIALR 85 contains the value of the length from the base of the secondary inbound window that defines the size of the window. Any PCI address from PCI address space 121 which falls within the range defined by the base and the length of the secondary inbound window will be translated to an address in local processor address space.

SIATVR 87 contains the value used in the translation of an inbound PCI cycle on secondary PCI bus 15. The translation of the inbound PCI address follows the formula:

Local_address=(PCI_address AND NOT(Limit_Register))

OR

Translate_Value_Register, where PCI_address is an address in PCI address space 121; Limit_Register is the value contained in SIALR 85; Translate_Value_Register is the value contained in SIATVR 87; and, Local_address is the PCI address translated to an address in local address space inside local processor 21.

SOMWVR 89 contains the value used in the translation of an outbound memory cycle to secondary PCI bus 15. Use of SOMWVR 89 will create the translated address from a secondary outbound memory window.

SOIOWVR 91 contains the value used in the translation of an outbound I/O cycle to secondary PCI bus 15. Use of SOIOWVR 91 will create the translated address from the secondary outbound memory window if a private device is I/O mapped and not memory mapped.

ATUCR 93 contains the following bits: a Secondary ATU PCI Error Interrupt Enable bit, a Direct Addressing Enable bit, a Secondary PCI Boot Mode Enable bit, a Secondary Direct Addressing Select bit, and a Secondary Outbound Enable bit.

Secondary ATU PCI Error Interrupt Enable bit acts as a mask for bits [4:0] of the Secondary ATU Interrupt Status Register (SATUISR) (not shown), which is a register that is used to notify local processor 21 of the source of a secondary ATU 27 error interrupt. In addition, SATUISR is written to clear the source of the interrupt. Setting the Secondary ATU PCI Error Interrupt Enable bit will enable an interrupt to local processor 21 when any of bits [4:0] is set in the SATUISR. Clearing the Secondary ATU PCI Error Interrupt Enable bit will disable the interrupt.

If Secondary PCI Boot Mode Enable bit is set, the secondary ATU will claim all local bus accesses with addresses in the range: FE000000H to FFFFFFFFH. This allows the local processor 21 to boot from secondary PCI bus 15. The translation algorithm will use SOMWVR 89 in this mode.

Direct Addressing Enable bit, if set, will enable direct addressing through the ATUs. Local bus cycles with an address between 0000.1000H and 07FFF.FFFFH will automatically be forwarded to the PCI bus with no address translation. The ATU which claims the direct addressing transaction is dependent on the state of the Secondary Direct Addressing Select bit. Secondary Direct Addressing Select, if set, will result in direct addressing outbound transactions to be forwarded through secondary ATU 27 to secondary PCI bus 15. When clear, direct addressing uses the primary ATU 23 and primary PCI bus 7. The Direct Addressing Enable bit must be set to enable direct addressing.

Secondary Outbound ATU Enable, if set, enables the secondary outbound translation function of secondary ATU 35. Clearing disables the secondary outbound translation function of secondary ATU 35.

SODWVR 95 contains the value used in the translation of an outbound DAC memory cycle to the secondary PCI bus. This is the window through which local processor 21 will read to or write from a private device if it is mapped into 64-bit address space.

SOUDR 97 contains the upper 32 bits of an outbound ATU DAC cycle which are untranslated.

SOCCAR 99 is used within the port programming model that is used by local processor 21 to configure devices on secondary bus 16. Local processor 21 will write the Type 0 configuration cycle address and then read from or write the to SOCCDR 101. SOCCDR 101 will initiate the cycle on secondary PCI bus 15 with the data from the cycle.

V. Creating Private Devices

Figure 6:
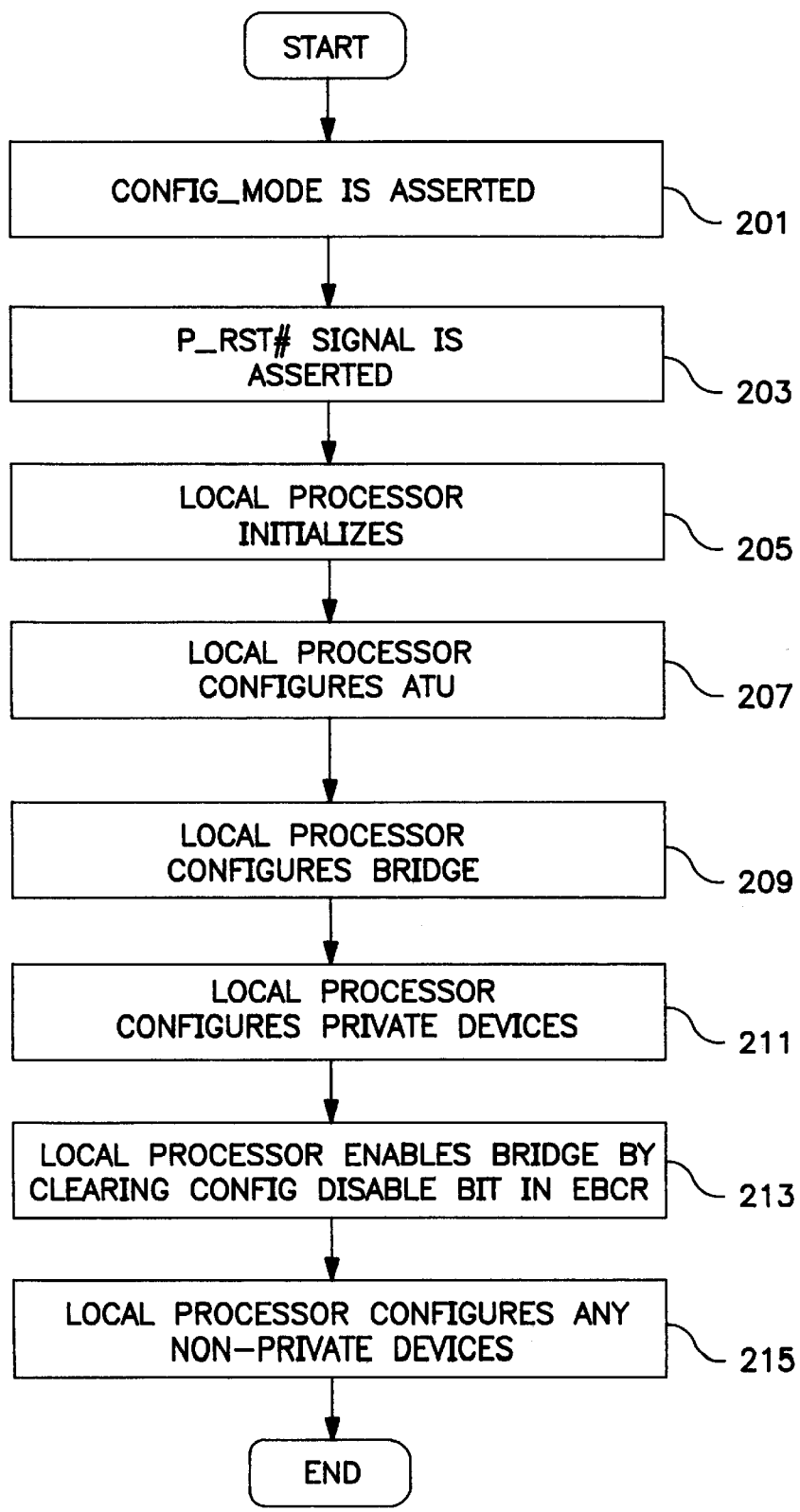
FIG. 6 is a flow diagram illustrating a method of creating the I/O subsystem using one embodiment of the I/O processor of the current invention.

FIG. 6 is a flow diagram illustrating a method for creating private PCI devices using an embodiment of the present invention. Reference will be made to the elements contained in FIGS. 1 and 2 when discussing FIG. 6.

In block 201, and referring to FIG. 1, in the preferred embodiment, CONFIG_MODE 19 is designed to be a hardware strap option sampled on the assertion of P_RST# 17. If CONFIG_MODE 19 is asserted when P_RST# 17 goes high, then the Configuration Cycle Disable bit of EBCR 73 is set. If CONFIG_MODE 19 is not asserted when P_RST# 17 goes high, then the Configuration Cycle Disable bit is cleared.

In block 203, the value of CONFIG_MODE 19 signal pin, which has been set, is written to Configuration Cycle Disable bit of EBCR 73 of bridge 29 when P_RST# 17 signal pin is asserted. When Configurations Cycle Disable bit of EBCR 73 is set, bridge 29 will not respond to any configuration cycles initiated by host processor 3.

In block 205, local processor 21 of I/O processor 5 goes through an initialization process. This initialization process is intended to be representative of the initialization process performed by all general computer processors. An example of the required procedures can be found in i960 Jx Microprocessor User's Manual, Order Number: 272483-001, Intel Corporation.

In block 207, local processor 21 of I/O processor 5 configures secondary ATU 27 by setting extended ATU configuration registers such that secondary ATU 27 will claim the addresses which are to be made private to local bus 31 and thereby preventing bridge 29 from forwarding them upstream to primary PCI bus 7.

In block 209, local processor 21 of I/O processor 5 configures additional configuration registers 71 of bridge 29. If private devices are to be created by the use of attaching the IDSEL of PCI devices to any one of S_AD[20:16], as described above, then local processor 21 will have to set the appropriate bit or bits of SISR 75 before continuing. Thus, SISR 75 must be programmed with the proper value to mask the appropriate bits in S_AD[20:16] before host processor 3 is allowed access to devices on secondary PCI bus 15 and probes secondary PCI bus 15 with Type 1 configuration commands.

In block 211, local processor 21 of I/O processor 5 configures any private PCI devices that have been created. The nature of the configuration of any private PCI device necessarily depend on which type of device is chosen for computer system 1. It will be appreciated that because private PCI devices are implemented by using any PCI device chosen from the general category of PCI devices, the operation and functions of which are well known, the actual details revolving around the configuration of any private devices by local processor 21 need not be discussed in detail.

In block 213, local processor 21 of I/O processor 5 clears Configuration Cycle Disable bit of EBCR 73, thereby allowing bridge 29 to respond to any configuration commands from host processor 3.

In block 215, I/O processor 5 has finished its initialization process and now is ready to accept configuration commands from host processor 3. When CONFIG_MODE 19 and P_RST# 17 were asserted, I/O processor 5 started signaling a Retry on all PCI configuration cycles it received on primary PCI bus 7. After Configuration Cycle Disable bit of EBCR 73 is cleared, host processor 3 can configure any public devices on secondary PCI bus 15, including base configuration registers 69 of bridge 29.

Figure 7:
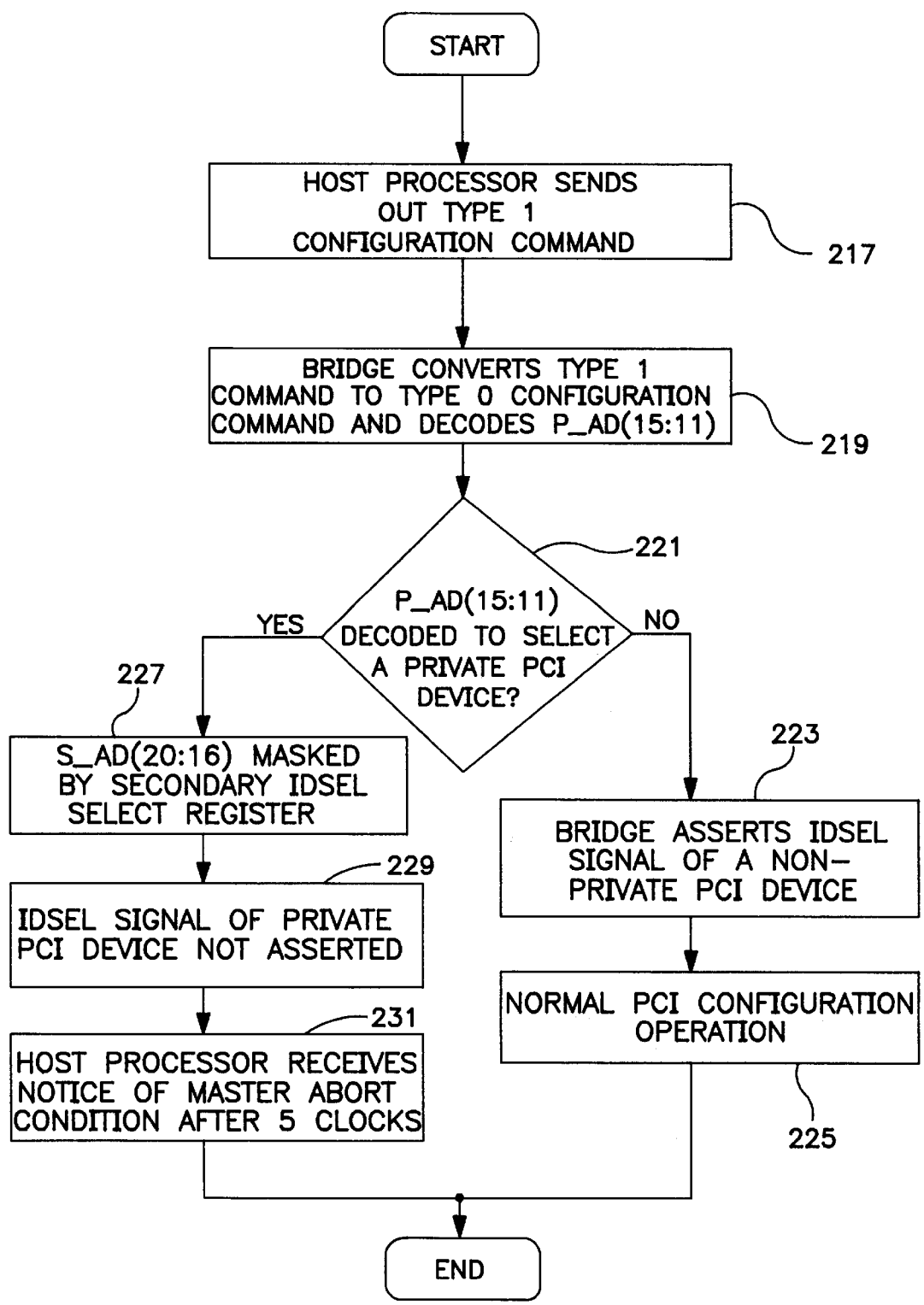
FIG. 7 is a flow diagram illustrating the operation of one embodiment of the I/O processor as it responds to configuration commands generated by a host processor.

FIG. 7 is a flow diagram illustrating the operation of I/O processor 5 as it responds to configuration commands generated on primary PCI bus 7 by host processor 3. FIG. 7 is a detailed description of block 215 of FIG. 6. Thus, FIG. 7 illustrates the operation of host processor 3 configuring PCI devices after local processor 21, bridge 29, primary ATU 23 and secondary ATU 27 have initialized.

In block 217, host processor 3 sends out a Type 1 configuration command directed towards bridge 29. It is typical procedure for processors to find all the devices in its environment and load software drivers to control these devices. Host processor 3 will thus try to find all PCI devices on secondary PCI bus 15 by going through bridge 29. Host processor 3 will send a Type 1 command for every address from P_AD[15:11]=000002 to P_AD[15:11]=111112. Alternatively, host processor 3 will stop at P_AD[15:11]= 011112 as, according to Table 1, there will not be any bits in S_AD[31:11] that will be asserted after P_AD[15]=1.

In block 219, bridge 29 of I/O processor 5 will convert the Type 1 configuration command received on primary PCI interface 33 from host processor 3 to a Type 0 configuration command. As part of the conversion, bridge 29 will decode P_AD[15:11] according to Table 1.

Referring to block 221, if there were no private PCI devices created by I/O processor 5 during its initialization as explained by the flow diagram in FIG. 6, operation would continue with block 223, where bridge 29 would assert the IDSEL signal of the device attached to the corresponding secondary address S_AD[31:16] and continue with normal PCI configuration operations in block 225. However, if private PCI devices were created during the initialization process of I/O processor 5 as illustrated by FIG. 6, where the private PCI devices were created by using SISR 75 as explained by FIGS. 3b and 3c, operation would continue with block 227.

In block 227, where private PCI devices have been created by using any one of bits [4:0] of SISR 75, P_AD [15:11] has been decoded to assert a bit in S_AD[20:16] which corresponds to the IDSEL of a private device. However, that bit will be deasserted as it is masked by the appropriate bit in bits [4:0] of SISR 75, as seen in Table 2. For example, referring again to FIG. 4c and Table 2, if PCI device 123 has been made private during initialization of I/O processor 5 by setting bit[1] of SISR 75 and P_AD[15:11] decodes to assert bit S_AD[17], then bit S_AD[17] will be masked to zero by bit [1] of SISR 75.

In block 229 and continuing to refer to FIG. 3c, bridge 29 will not assert the IDSEL line of private PCI device 61 as bit S_AD[17] has been masked to zero by bit [1] of SISR 75.

In block 231, host processor 3 will receive a Master Abort condition from bridge 29 after 5 PCI clock cycles after FRAME#. Host processor 3 will then continue its normal configuration procedures.

Private PCI devices, once created, still need to be configured. Referring again to Local processor 21 is capable of internally generating Type 0 read and write commands on secondary PCI interface 35 that are not originally initiated as Type 1 commands on primary PCI bus 7. These Type 0 commands are required to configure private PCI devices on secondary PCI bus 15 which are in private PCI address space. Any device mapped into this private address space will NOT be part of the standard secondary PCI address space and therefore will not be configured by the system host processor. These devices are hidden from PCI configuration software but are accessible by using secondary ATU 27. The Type 0 configuration reads and writes can be generated by the Address Translation Unit.

Secondary outbound configuration cycles are used to support private PCI devices. The outbound ATU's provide a port programming model for outbound configuration cycles. Performing an outbound configuration cycle to either primary PCI bus 7 or secondary PCI bus 15 involves up to two local bus cycles:

1) Writing SOCCAR 99 with the PCI address used during the configuration cycle. See PCI Local Bus Specification, Revision 2.0, for information regarding configuration address cycle formats. This local processor cycle enables the transaction.

2) Writing or reading SOCCDR 101. This local processor cycle initiates the transaction. A read will cause a configuration cycle read to secondary PCI bus 15 with the address that is in SOCCAR 99. A write will similarly initiate a configuration cycle write to secondary PCI bus 15 with the write data from the second processor cycle.

Configuration cycles are non-burst and restricted to a single word cycle. Local processor burst writes to either primary ATU 23 or secondary ATU 27 would be ignored and burst reads would return FFFF.FFFFH for data words after the first.

To summarize, what has been described thus far is a PCI-to-PCI bridge configured to accommodate the creation of private address spaces on a secondary PCI bus. The PCI-to-PCI bridge is advantageously employed within a computer system 300 of the type illustrated in FIG. 8 having a primary PCI bus 302 connected through a host-to-PCI bridge 304 to a host bus 306. Bus 306 interconnects one or more microprocessors 308 and other components such as, for example, a cluster attachment 310. Cluster attachment 310 facilitates interconnection of computer system 300 with other computer systems for parallel processing applications.

Within computer system 300 a PCI-to-PCI bridge 312 interconnects primary PCI bus 302 with a secondary PCI bus 314. PCI-to-PCI 312 is configured as described above in FIGS. 1–7 to define private address spaces visible only to devices, such as PCI devices 316–322, connected to secondary bus 314.

Primary and secondary PCI buses 302 and 314 are hierarchically interconnected and therefore share a common address space. The common address space is illustrated in FIG. 9. More specifically, FIG. 9 illustrates an address space 330 having a positive decode portion 332 and an inverse positive decode portion 324. Transactions on the primary PCI bus within positive decode portions 322 are routed to the secondary PCI bus. Transactions within the inverse positive decode address space 324 found on the secondary PCI bus are routed to the primary PCI bus. FIG. 9 further illustrates a private address space 326. Transactions having addresses within the private address space are not captured by the PCI-to-PCI bridge and forward it to the primary PCI bus. As noted above, use of private address space allows devices connected to the secondary PCI bus, such as devices 316–322 of FIG. 8, to communicate with one another without any transactions associated with that communication to be visible to any component upstream from the PCI-to-PCI bridge.

Subtractive Bridge Operations

Figure 8:
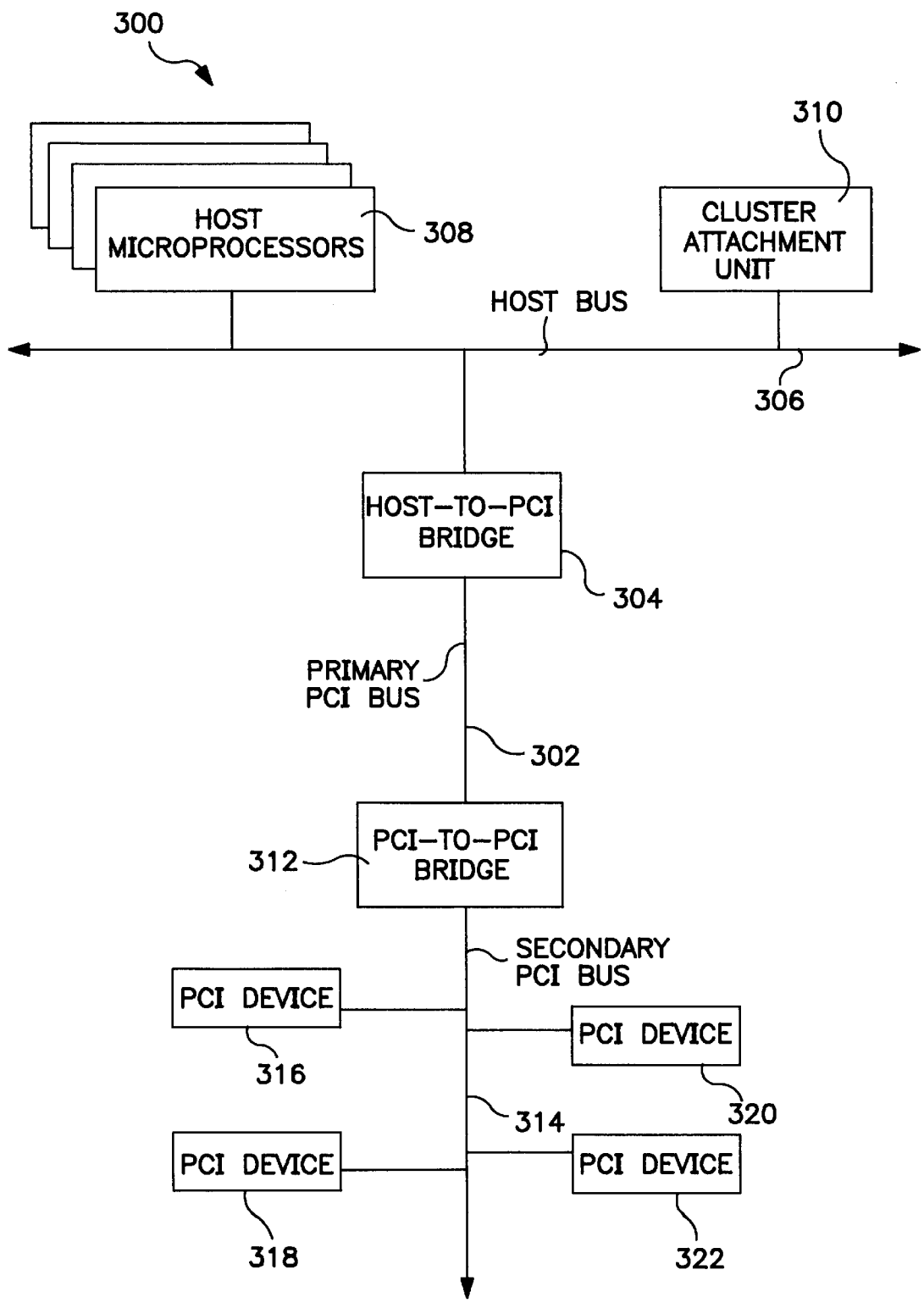
FIG. 8 is a block diagram of a computer system having a hierarchical PCI bus arrangement.
Figure 9:
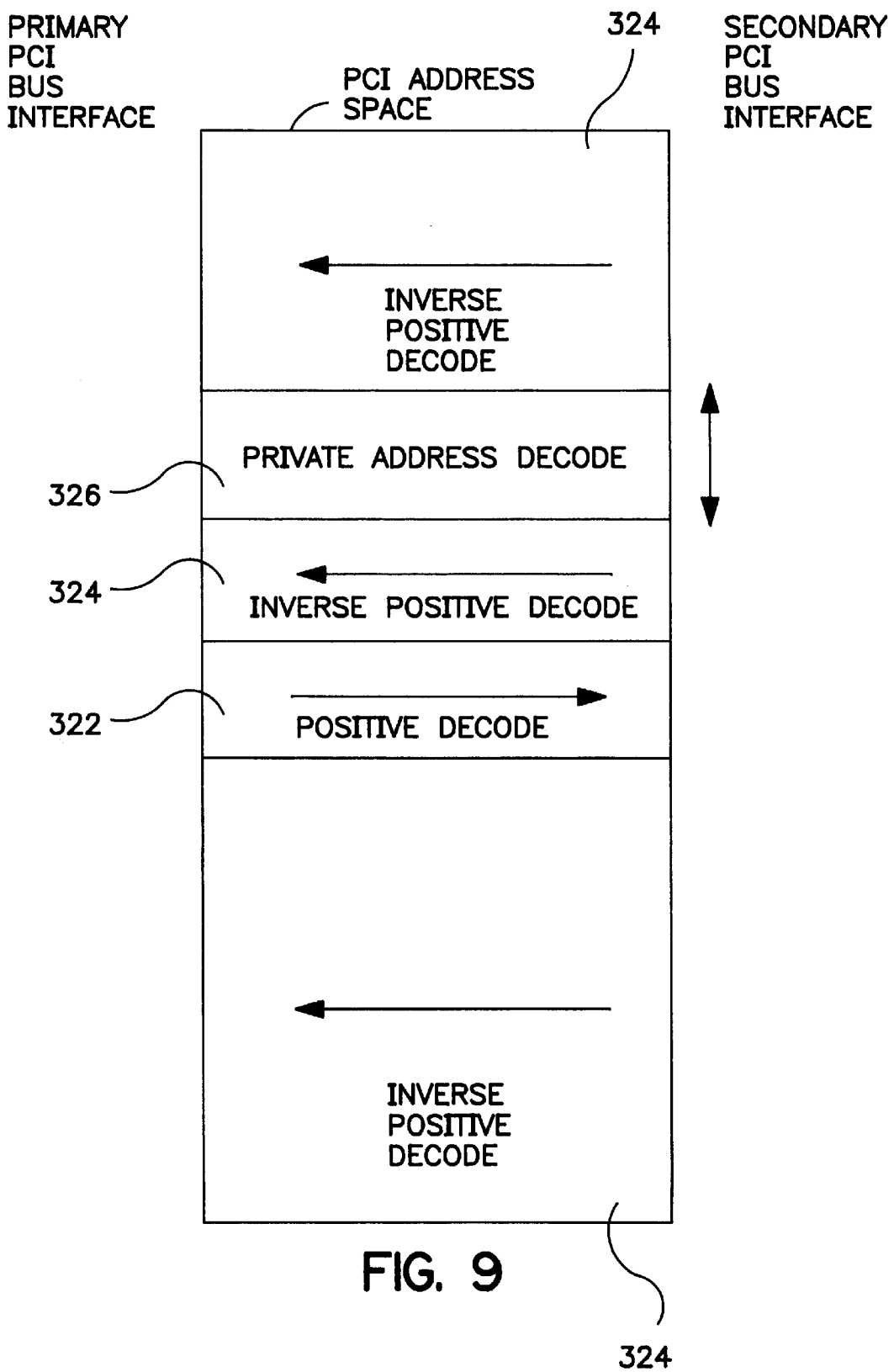
FIG. 9 is a block diagram of a PCI address space incorporating private address spaces for use with the hierarchical PCI bus arrangement of FIG. 8.

Continuing with the description of FIGS. 8 and 9, circumstances can arise wherein, for one reason or another, transactions having addresses within a private address space are not captured by any of the devices connected to the secondary PCI bus. Such can occur, for example, if a target device is deactivated prior to reception of a transaction intended for the device. To avoid an error condition occurring as a result of a transaction not being claimed by any entity on the secondary PCI bus, PCI-to-PCI bridge 312 of FIG. 8 is configured to perform subtractive bridge routing operations in addition to the various operations described above with reference to FIGS. 1–7. More specifically, bridge 312 is configured to capture any transactions on the secondary PCI bus not captured by any other element after a predetermined number of clock cycles. Such prevents transactions from remaining unclaimed on the secondary PCI bus. The subtractive bridging operation is not limited only to transactions having addresses within the private address space but applies to all transactions on the secondary PCI bus. The predetermined number of clock cycles will vary, depending upon the implementation, based upon the requirements of the various devices of interconnected to the secondary PCI bus. In one example, the bridge captures any transaction not claimed after four clock cycles. To prevent conflicts with other subtractive bus devices, bridge 312 should be enabled to perform subtractive bridging operation only when no other subtractive devices, such as IDE buses, are connected to the secondary bus.

Referring briefly again to FIG. 2, the subtractive bus operation is implemented within the processor illustrated therein by either providing appropriate software within local processor 21 or by configuring circuitry within secondary ATU 27 or secondary PCI interface 35. Appropriate software programs or state machine circuits are employed for tracking the number of clock cycles for any unclaimed transactions and triggering capture of the transaction after the predetermined number of clock cycles has elapsed. Actual implementation of software or circuitry depends on the particular implementation of the I/O processor. In one exemplary embodiment, subtractive operations are implemented in the same manner by which subtractive operations are implemented within other subtractive devices such IDE bus interface devices.

Figure 10:
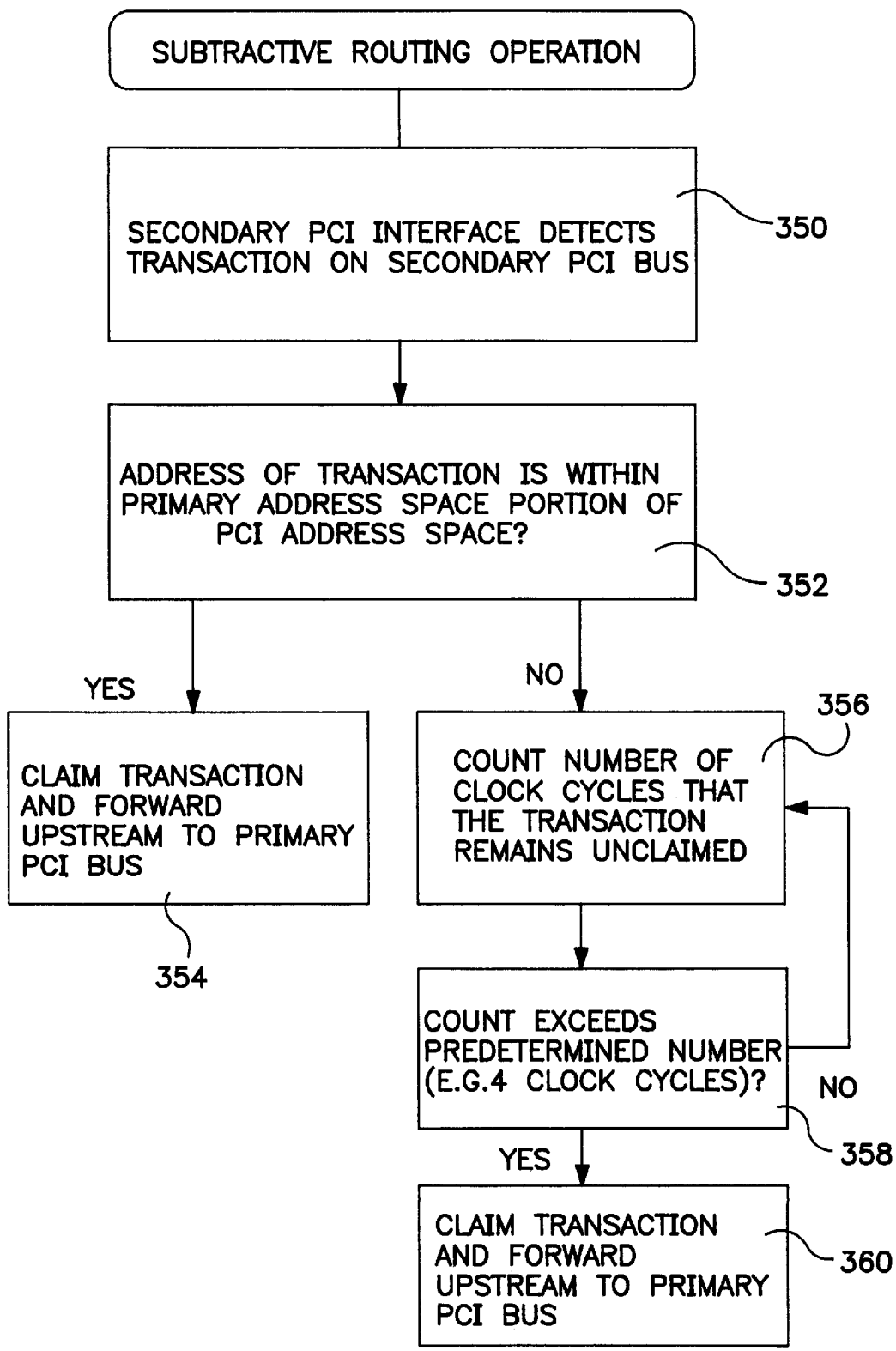
FIG. 10 is a flowchart illustrating a method for implementing a subtractive bridging operation within the computer systems of FIGS. 8 and 9.

FIG. 10 is a flowchart summarizing the method for performing subtractive bus operations. Initially, at step 350, bridge 312 of FIG. 8 detects a transaction on the secondary PCI bus. At 352, the bridge determines whether the transaction is within an inverse positive decode portion of the address space. If so then, at step 354, the bridge claims the transaction and routes the transaction to the primary PCI bus. If not, then at step 356, the bridge begins to count the number of clock cycles that the transaction remains unclaimed. If, at step 358, the counted number of clock cycles exceeds a predetermined number, such as four, the bridge captures the transaction and routes it to the primary PCI bus. In this manner, transactions not claimed by other devices on the bus are captured by the bridge and routed to the primary bus either immediately, if within the inverse positive decode address space, or after four clock cycles otherwise.

Thus far, PCI bus systems having hierarchical primary and secondary PCI buses, such as illustrated in FIG. 8, have been described. With reference to the remaining figures, bus systems having two or more peer PCI buses will be described.

Intelligent Bridging Operations

Figure 11:
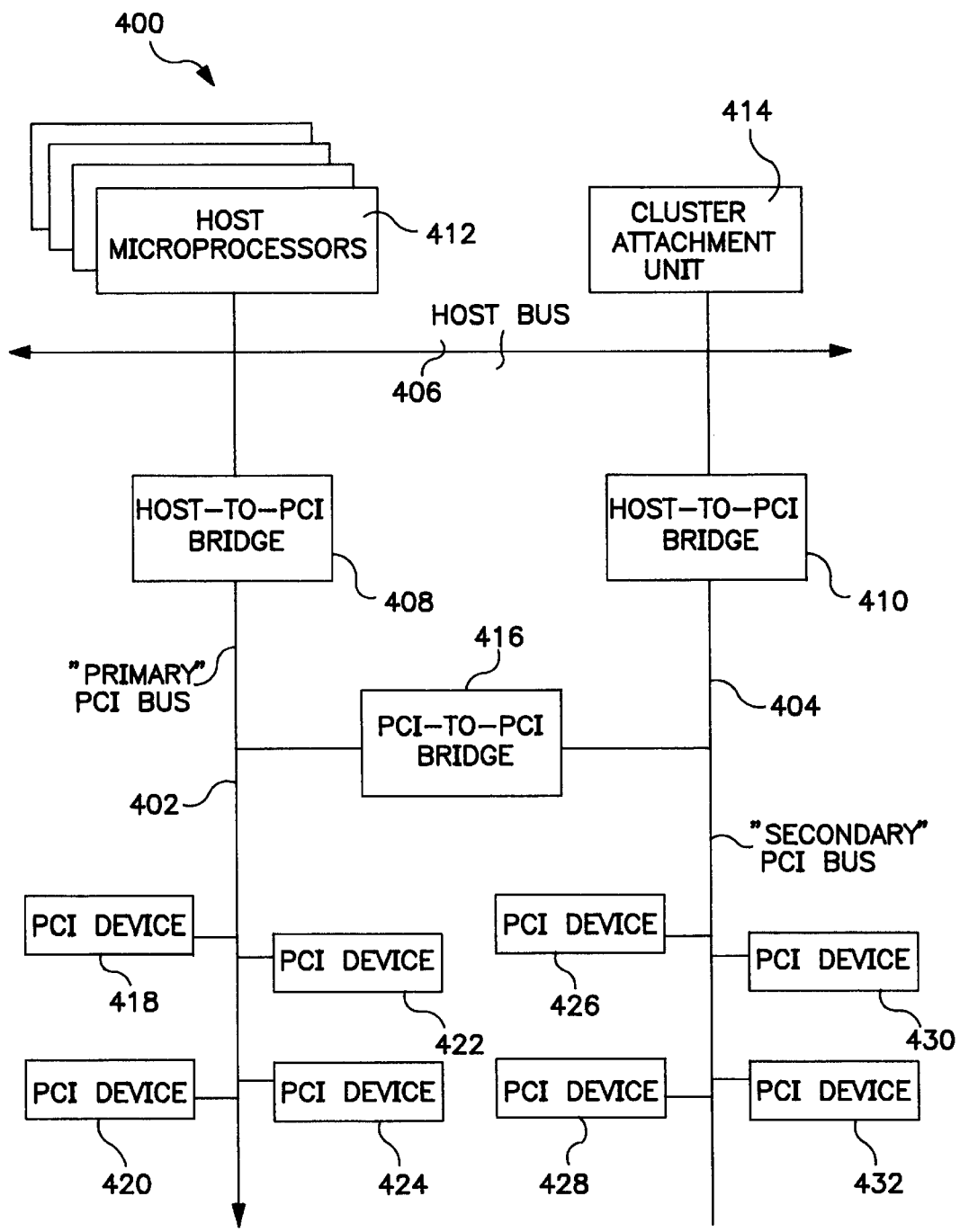
FIG. 11 is a block diagram of alternative computer system employing a pair of peer PCI buses.

FIG. 11 illustrates a computer system 400 having a pair of primary PCI buses 402 and 404 connected to a host bus 406 by respective host-to-PCI bridges 408 and 410. Host bus 406 interconnects one or more microprocessors 412 and other components including, for example, a cluster attachment unit 414.

PCI buses 402 and 404 are interconnected by a PCI-to-PCI bridge 416. PCI buses 402 and 404 are both primary PCI buses and therefore have separate PCI address spaces each of which may include, for example, 4 gigabytes. Bridge 416 may be configured in the manner described above with reference to FIGS. 1–10 subject to modifications described below.

With this arrangement, PCI devices, such as devices 418–424 of bus 402, may communicate with devices 426–432 through bridge 416 rather than through bridges 408 and 410 and host bus 406. Device to device transactions are accommodated without burdening either of bridges 408–410, host bus 406 and processors 412. To facilitate such transactions, one of the peer PCI buses 402 and 404 is designated as a primary bus and the other as a secondary bus by bridge 416. Since buses 402 and 404 are peer buses, such designations are arbitrary. In the following, bus 402 will be regard as the primary bus and bus 404 as the secondary bus.

Also to accommodate peer to peer transactions, bridge 416 is configured to perform intelligent bridging operations wherein conventional inverse positive decode operations are disabled and only transactions having addresses within selected reverse positive decode spaces are routed from "secondary" bus 404 to "primary" bus 402.

Figure 12:
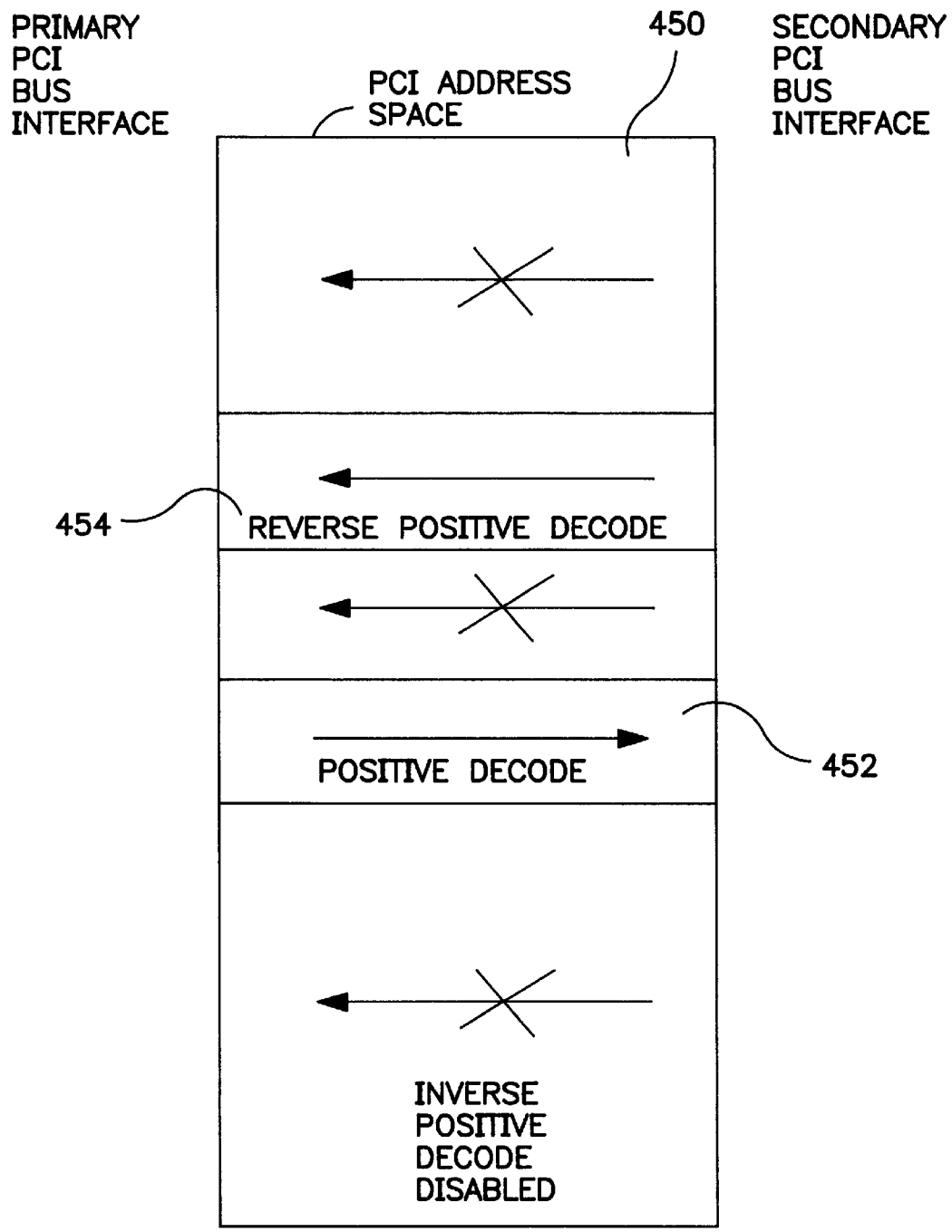
FIG. 12 is a block diagram of a PCI address space subject to intelligent bridging operations performed by a PCI-to-PCI bridge of the computer system of FIG. 11.

A resulting exemplary address space as seen by the secondary interface of bridge 416 is illustrated in FIG. 12. More specifically, FIG. 12 illustrates an address space 420 having a secondary address space window (or positive decode window) 452 and a reverse positive decode window 454. Any transactions on the primary bus 402 within address space 452 is routed through bridge 416 to secondary bus 404. Any transactions having addresses within reverse positive decode address space 454 found on the secondary bus are routed to the primary bus 402. No other transactions are routed over bridge 416. As such, all remaining portions of the address space are effectively conventional primary address spaces subject only to routing through bridges 408 and 410 to host processor 406. Preferably, bridges 408 and 410 are configured to perform subtractive bus operations, of the type described above, to capture any transactions not captured by the various PCI devices or bridge 416. Alternatively, bridge 416 may be configured to perform subtractive bus operations on both peer buses. In such case, bridges 408 and 410 should not perform subtractive operations since such could result in a conflict.

Figure 13:
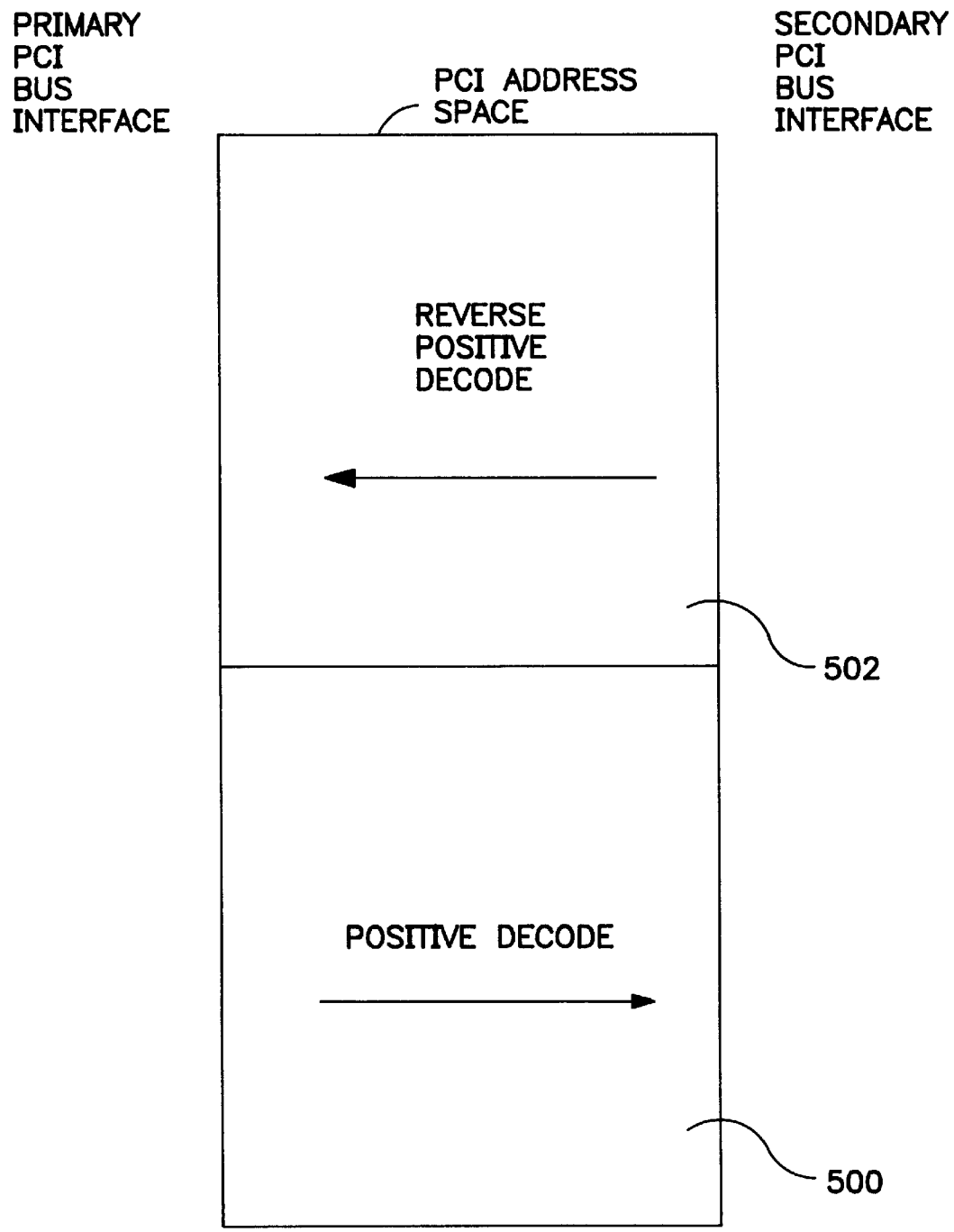
FIG. 13 illustrates an alternative address space configuration.

Thus, FIG. 12 illustrates an address space having positive decode and reverse positive decode spaces are windows. FIG. 13 illustrates an alternative address space configuration wherein all portions of the address space are either within a positive decode portion 500 or a reverse positive decode portion 502. With the arrangement of FIG. 13, the overall address space is equally divided between the pair of peer buses.

Figure 14:
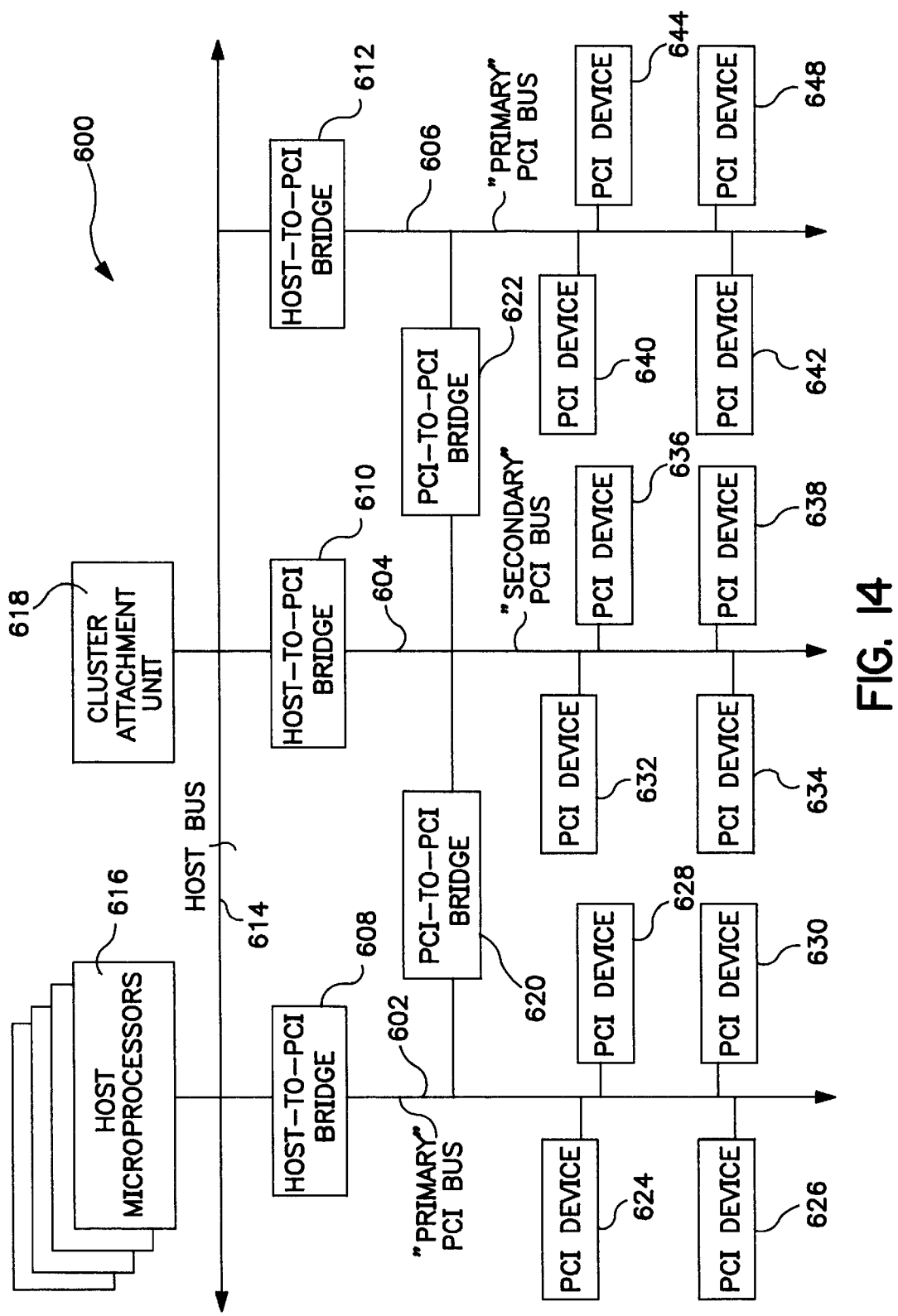
FIG. 14 is an alternative computer system having three peer PCI buses.

FIG. 14 illustrates an alternative arrangement of peer PCI buses. More specifically, a system 600 is illustrated having three primary PCI buses 602, 604 and 606 connected through respective host-to-PCI bridges 608, 610 and 612 to a host bus 614. The host bus interconnects one or more microprocessors 616 and other components including, for example, a cluster attachment unit 618.

A first PCI-to-PCI bridge 620 interconnects buses 602 and 604. A second PCI-to-PCI bridge 622 interconnects buses 604 and 606. Both are configured to perform the intelligent bridging operations described above. In one arrangement, bridge 620 is configured to designate bus 602 as a primary bus and bus 604 as a secondary bus. Bridge 622 is configured to designate bus 606 as the primary bus and bus 604 as the secondary bus. Hence, bus 604 is a secondary bus to both buses 602 and 606. Of course, each of the three PCI buses are peer PCI buses having separate address spaces. Accordingly, the primary and secondary designations is purely arbitrary.

With this arrangement devices interconnected to bus 602, such as devices 624–630, can communicate directly with devices 632–638 connected to bus 604. Likewise, devices 632–638 of bus 604 can communicate with devices 640–646 over bridge 622. Devices connected to bus 602 may communicate with devices connected to bus 606 by having transactions routed through both bridges 620 and 622. All of the foregoing transactions can be accommodated without routing over host bus 614 and therefore without burdening any of the processors connected thereto or any of the host-to-PCI bridges.

Figure 15:
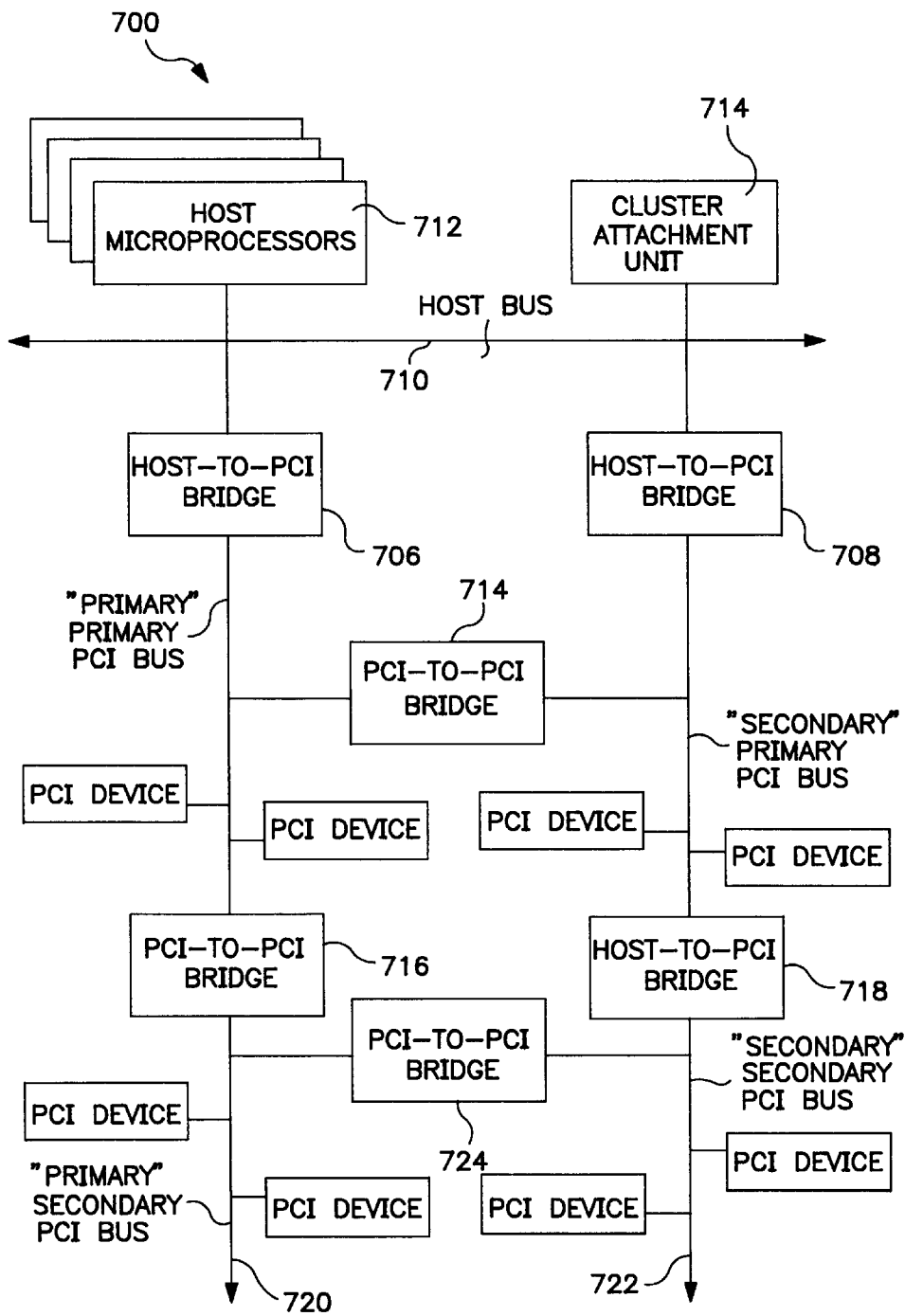
FIG. 15 is a block diagram of another alternative computer system having a pair of hierarchical PCI buses.

FIG. 15 illustrates another arrangement for peer PCI buses. More specifically, FIG. 15 illustrates a computer system 700 having first and second primary PCI buses 702 and 704 connected, respectively, through host-to-PCI bridges 706 and 708 to a host bus 710. The host bus interconnects one or more host microprocessors 712 as well as other devices such as, for example, a cluster attachment unit 714.

A PCI-to-PCI 716 interconnects buses 702 and 704 in much the same manner as illustrated in FIG. 11 above. However, a pair of additional PCI-to-PCI bridges 716 and 718 respectively connect primary buses 702 and 704 to secondary buses 720 and 722. Another PCI-to-PCI bridge 724 directly interconnects the two secondary buses 720 and 722.

With this arrangement, intelligent bridging operations are performed by bridges 714 and 724 while private addresses are defined within the secondary PCI buses by bridges 716 and 718. Any of the various PCI-to-PCI bridges may be additionally configured to perform a subtractive operations described above with the limitation that no two devices performing subtractive operations should be connected to the same PCI bus to avoid conflicts between subtractive operations.

Although not separately illustrated, additional PCI-to-PCI bridges may be provided for interconnecting the secondary PCI buses to tertiary PCI buses. Tertiary PCI buses may be interconnected directly by yet another PCI-to-PCI bridge.

As can be appreciated, a wide range of PCI bus systems can be configured consistent with the invention by employing the PCI-to-PCI bridges described above and in particular by employing the aforementioned private address spaces, subtractive routing operations and intelligent bridging operations. The embodiments described herein are merely illustrative of the principles of the invention and should not be construed as limiting the scope of the invention.

What is claimed is:

1. A computer system comprising:

a host processor;

a system bus connected to the host processor;

first and second PCI buses;

first and second host-to-PCI bridges respectively connecting said first and second PCI buses to said host bus; and a PCI-to-PCI bridge interconnecting said first and second PCI buses.

2. The computer system of claim 1 further including:

first and second secondary PCI buses;

second and third PCI-to-PCI bridges respectively connecting said first and second PCI buses to said first and second secondary PCI buses; and a fourth PCI-to-PCI bridge interconnecting said first and second secondary PCI buses.

3. The computer system of claim 1 wherein said first and second PCI buses are peer buses having separate PCI address spaces.

4. The computer system of claim 3 wherein said PCI-to-PCI bridge arbitrarily designates one PCI bus as primary and another PCI bus as secondary by routing transactions having addresses within reverse positive decode spaces from said secondary PCI bus to said primary PCI bus and routing transactions having addresses within positive decode spaces from said primary PCI bus to said secondary PCI bus.

* * * * *